United States Patent
Kose et al.

(10) Patent No.: US 9,346,161 B2
(45) Date of Patent: May 24, 2016

(54) ROBOT AND ROBOT CONTROL METHOD

(71) Applicant: CANON KABUSHIKI KAISHA, Tokyo (JP)

(72) Inventors: Hidekazu Kose, Tokyo (JP); Kiyoshi Takagi, Tokyo (JP)

(73) Assignee: CANON KABUSHIKI KAISHA, Tokyo (JP)

(*) Notice: Subject to any disclaimer, the term of this patent is extended or adjusted under 35 U.S.C. 154(b) by 66 days.

(21) Appl. No.: 13/910,526

(22) Filed: Jun. 5, 2013

(65) Prior Publication Data

US 2013/0345877 A1   Dec. 26, 2013

(30) Foreign Application Priority Data

Jun. 25, 2012 (JP) ................. 2012-141597

(51) Int. Cl.
*B25J 9/00* (2006.01)
*B25J 9/16* (2006.01)
*B25J 9/10* (2006.01)

(52) U.S. Cl.
CPC ............ *B25J 9/1633* (2013.01); *B25J 9/0078* (2013.01); *B25J 9/104* (2013.01); *B25J 9/1615* (2013.01); *G05B 2219/39457* (2013.01); *G05B 2219/40273* (2013.01); *Y10S 901/21* (2013.01)

(58) Field of Classification Search
CPC ........ B25J 9/0021; B25J 9/0078; B25J 9/104; B25J 9/1045; B25J 9/1615; B25J 9/1633; Y10S 901/21; G05B 2219/39457
USPC ................ 700/245, 250, 260, 261; 901/21; 74/490.04
See application file for complete search history.

(56) References Cited

U.S. PATENT DOCUMENTS

| | | | |
|---|---|---|---|
| 7,385,686 B2 | 6/2008 | Shiba et al. | |
| 7,615,956 B2 | 11/2009 | Tsusaka | |
| 2012/0072026 A1* | 3/2012 | Takagi | B25J 9/1075 700/261 |
| 2013/0211595 A1 | 8/2013 | Takagi | |
| 2013/0211596 A1 | 8/2013 | Takagi | |

FOREIGN PATENT DOCUMENTS

JP   2006-035325 A   2/2006

OTHER PUBLICATIONS

Park et al., "Optimization of Tendon-Driven Robot Joint Stiffness Using GA-based Learning", JRSJ, vol. 24, No. 4, May 2006, pp. 482-488.

* cited by examiner

*Primary Examiner* — Spencer Patton
(74) *Attorney, Agent, or Firm* — Fitzpatrick, Cella, Harper & Scinto

(57) ABSTRACT

Provided are a robot and a robot control method in which highly accurate positioning of a link is enabled without losing flexibility of a joint.

18 Claims, 18 Drawing Sheets

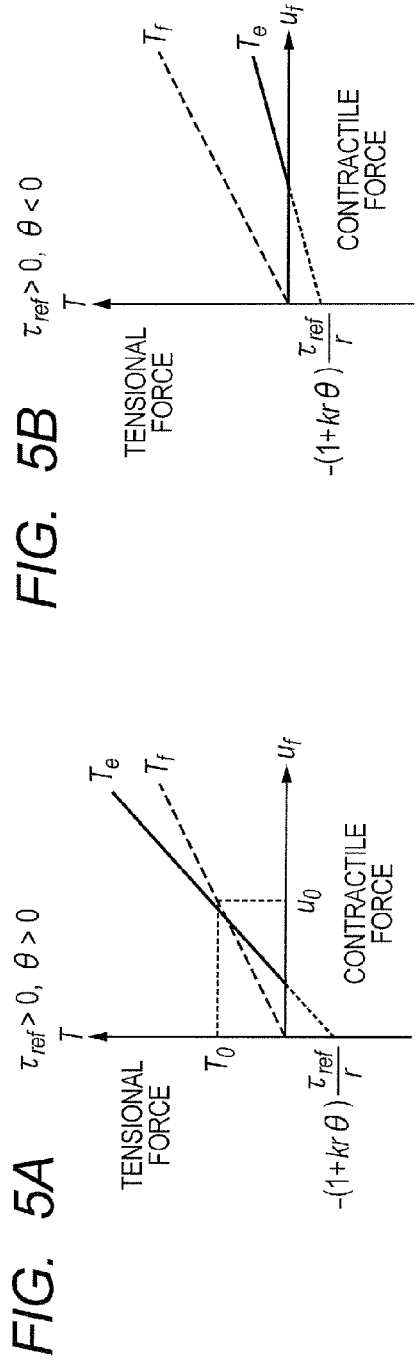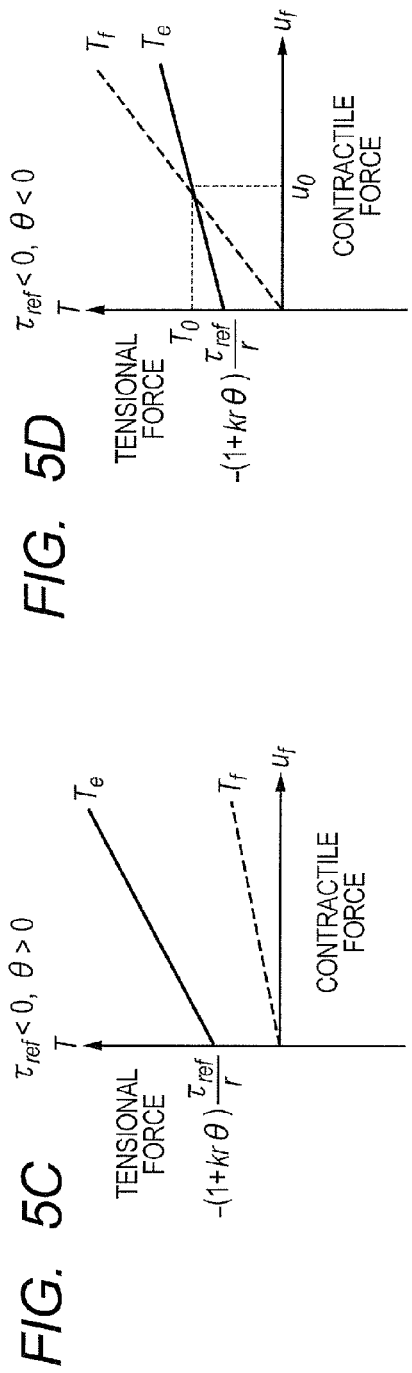

ROBOT AND ROBOT CONTROL METHOD

BACKGROUND OF THE INVENTION

1. Field of the Invention

The present invention relates to a robot and a robot control method that use string-shaped members, such as wires and belts, as transfer mechanisms of driving force.

2. Description of the Related Art

In recent years, realization of a robot capable of joint work with a human is desired. A manipulator used in the robot not only needs to be capable of highly accurate positioning as in a conventional manipulator, but also needs to be flexible upon collision with a human.

A method of using an actuator including a variable stiffness mechanism to control stiffness of a joint is known as a method of realizing the flexible manipulator. Also known is a method of using wires or belts to transfer driving force to a joint to thereby set an actuator on a base to reduce mass of a movable section. Therefore, both a variable stiffness actuator and a wire driving mechanism can be used to realize a manipulator with significantly high flexibility.

Conventionally, proposed is a technique for realizing a variable stiffness mechanism by inserting a non-linear spring element to a path for transferring driving force using a wire, wherein the elastic coefficient of the non-linear spring element changes in proportion to tensional force (see Park et al., "Optimization of Tendon-Driven Robot Joint Stiffness using GA-based Learning", Journal of Robotics Society of Japan, May 15, 2006, Vol. 24, No. 4, pp. 482 to 488). A wire tensional force reference value for simultaneously realizing trajectory tracking control of hand and control of joint stiffness is computed through learning using a genetic algorithm.

Also proposed is a robot with a wire used as a variable stiffness mechanism, wherein the elastic coefficient of the wire non-linearly changes in proportion to the amount of expansion and contraction (see Japanese Patent Application Laid-Open No. 2006-35325). A feedback controller is used to cause a joint angle to follow a target trajectory. However, in feedback control, if the natural frequency of one of vibration perpendicular to the expansion/contraction direction of the wire (hereinafter, called "string vibration") and vibration around the joint caused by elasticity of the wire is equal to or smaller than a control bandwidth, the controller excites the vibration of the wire, and the control system becomes unstable. Therefore, in Japanese Patent Application Laid-Open No. 2006-35325, the control bandwidth of the feedback controller is limited to stabilize the control system if the natural frequency of the wire decreases as a result of a reduction in the tensional force of the wire. Since the stiffness is not controlled in Japanese Patent Application Laid-Open No. 2006-35325, the joint stiffness is determined by control input for position feedback.

However, the tensional force of the wire for realizing desired joint stiffness is computed through learning in Park et al., "Optimization of Tendon-Driven Robot Joint Stiffness using GA-based Learning", Journal of Robotics Society of Japan, May 15, 2006, Vol. 24, No. 4, pp. 482 to 488. Therefore, repetitive calculation needs to be performed again to change the target value of the joint stiffness, and the target value cannot be easily changed. Furthermore, since only the feedforward controller is used to perform tracking control of the target trajectory, the positioning accuracy is significantly reduced due to a model error or a disturbance to a link.

Meanwhile, in Japanese Patent Application Laid-Open No. 2006-35325, the positioning accuracy is degraded if the control bandwidth is reduced as a result of the reduction in the tensional force of the wire. Therefore, the realization of highly accurate positioning control is difficult in the techniques. Furthermore, since the joint stiffness is not controlled in Japanese Patent Application Laid-Open No. 2006-35325, the elastic coefficient of the wire increases if a large tensional force command value is output in the positioning control, and the flexibility of the joint is lost.

An object of the present invention is to provide a robot and a robot control method capable of highly accurate positioning of a link without losing flexibility of a joint.

SUMMARY OF THE INVENTION

The present invention provides a robot including: a link that rotates at a joint; a first string-shaped member and a second string-shaped member connected to the link and arranged in an antagonistic manner; a drive unit that includes a first actuator that generates driving force for advancing and retreating the first string-shaped member and a second actuator that generates driving force for advancing and retreating the second string-shaped member, the drive unit generating torque around the joint based on a difference in the driving force and providing stiffness to the joint based on a sum of the driving force; and a control device that controls the driving force generated by the first and second actuators, the control device including: a position control unit that calculates a torque command value around the joint based on angular deviation of a joint angle relative to a reference joint angle received from the outside; a tensional force minimum value calculation unit that obtains a natural frequency of each string-shaped member satisfying $f_n > f_{min} > f_c$, $f_{min}$ indicating the natural frequency, $f_c$ indicating a control bandwidth of the position control unit, $f_n$ indicating a Nyquist frequency of the position control unit, and calculates a tensional force minimum value of the first and second string-shaped members from a relational expression $T_{min} = 4 \times L^2 \times \mu \times f_{min}^2$, L indicating length of the first and second string-shaped members, $\mu$ indicating linear mass density of the first and second string-shaped members, and $T_{min}$ indicating the tensional force minimum value; a driving force command value calculation unit that calculates driving force command values of the first and second actuators by using the tensional force minimum value, the joint angle and the torque command value so that tensional force of one of the first and second string-shaped members with the smaller tensional force coincides with the tensional force minimum value; and a drive control unit that generates, on the first and second actuators, driving force corresponding to the driving force command values obtained by the driving force command value calculation unit.

The present invention provides a robot control method of controlling a robot body by a control device, the robot body including: a link that rotates at a joint; a first string-shaped member and a second string-shaped member connected to the link and arranged in an antagonistic manner; and a drive unit that includes a first actuator that generates driving force for advancing and retreating the first string-shaped member and a second actuator that generates driving force for advancing and retreating the second string-shaped member, the drive unit generating torque around the joint based on a difference in the driving force and providing stiffness to the joint based on a sum of the driving force, the robot control method including: a position control unit of the control device calculating a torque command value around the joint of the link based on angular deviation of a joint angle relative to a reference joint angle received from the outside; a tensional force minimum value calculation unit of the control device obtaining a natural frequency of each string-shaped member satisfying $f_n > f_{min} > f_c$, $f_{min}$ indicating the natural frequency, $f_c$ indicating a control bandwidth of the position control unit, $f_n$ indicating a Nyquist frequency of the position control unit, and calculating a tensional force minimum value of the first and second string-shaped members from a relational expression $T_{mm} = 4 \times L^2 \times \mu \times f_{min}^2$, L indicating length of the first and second string-shaped members, μ indicating linear mass density of the first and second string-shaped members, and $T_{min}$ indicating the tensional force minimum value; a driving force command value calculation unit of the control device calculating driving force command values of the first and second actuators by using the tensional force minimum value, the joint angle and the torque command value so that tensional force of one of the first and second string-shaped members with the smaller tensional force coincides with the tensional force minimum value; and a drive control unit of the control device generating, on the first and second actuators, driving force corresponding to the driving force command values obtained by the driving force command value calculation unit.

Further features of the present invention will become apparent from the following description of exemplary embodiments with reference to the attached drawings.

BRIEF DESCRIPTION OF THE DRAWINGS

FIGS. 5A, 5B, 5C and 5D are diagrams illustrating relationship between contractile force of an artificial muscle actuator and tensional force of a wire.

DESCRIPTION OF THE EMBODIMENTS

Preferred embodiments of the present invention will now be described in detail in accordance with the accompanying drawings.

First Embodiment

In the present first embodiment, a one-link manipulator is highly accurately positioned, wherein artificial muscle actuators are used as variable stiffness mechanisms, and wires are used as transfer mechanisms of driving force. A feedback control unit with a wide control bandwidth needs to be used to improve the positioning accuracy. Therefore, in addition to position control, tensional force control for maintaining the tensional force of the wire of equal to or greater than a certain value is performed.

(1.1 Model Derivation)

Figure 1:
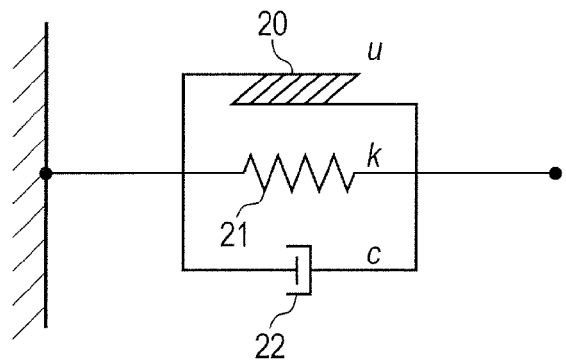
FIG. 1 is a schematic diagram of a viscoelastic model of an artificial muscle actuator.

In the present first embodiment, a manipulator using artificial muscle actuators as variable stiffness mechanisms is controlled. The artificial muscle actuator is an actuator with characteristics similar to viscoelasticity of muscle. As illustrated in FIG. 1, a force generation element 20, an elastic element 21 and a viscous element 22 are used to model the artificial muscle actuator. Contractile force of the force generation element 20 is defined as u, and a contraction amount of muscle is defined as x wherein a contraction direction is positive. Contraction speed is defined as follows.

$$\dot{x}$$

An elastic force constant is defined as k, a viscous force constant is defined as c, and muscle contractile force is defined as F. In this case, viscoelastic characteristics of muscle are expressed as follows.

$$F = u - kux - cu\dot{x} \quad (1)$$

As illustrated in Formula (1), the artificial muscle actuator has non-linearity, in which the elastic force and the viscous force are in proportion to the contractile force u of the force generation element.

Figure 2:
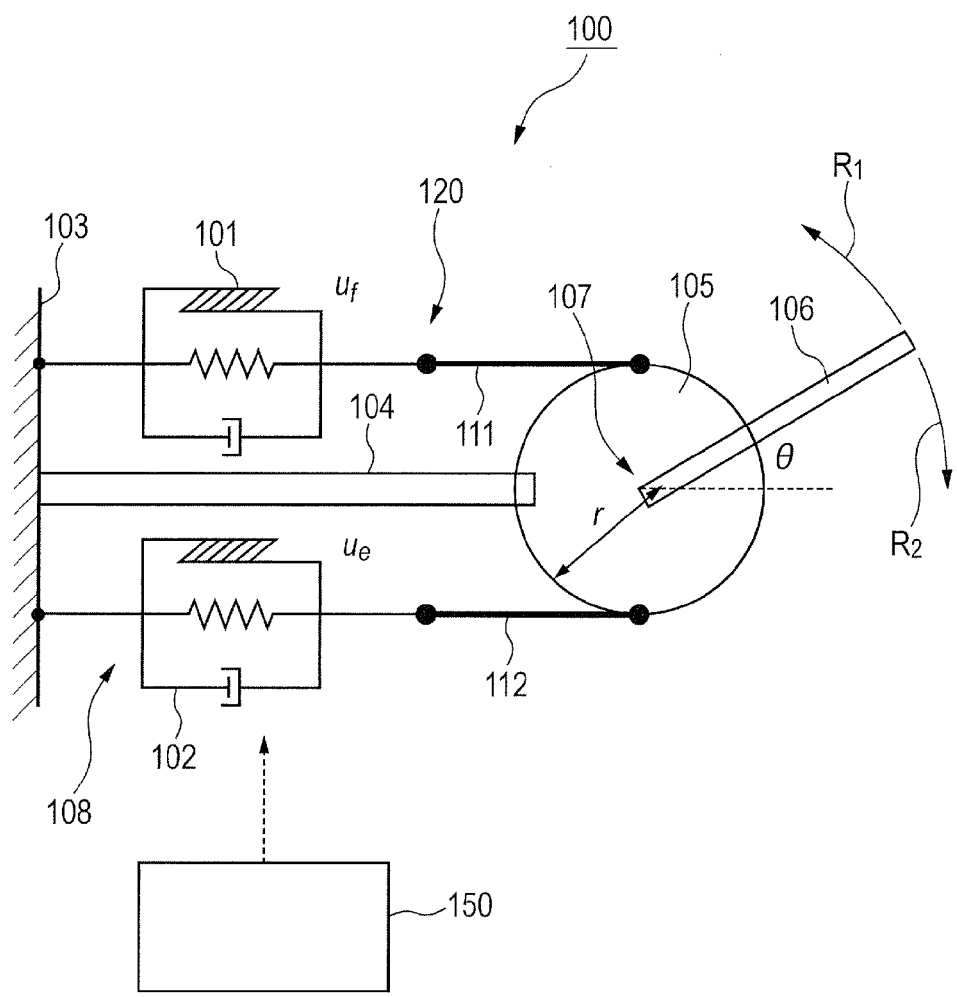
FIG. 2 is an explanatory view illustrating a schematic configuration of a robot according to a first embodiment of the present invention.

FIG. 2 is an explanatory view illustrating a schematic configuration of a robot according to the first embodiment of the present invention. A robot 100 illustrated in FIG. 2 includes: a robot body 120 that is a one-link manipulator; and a control device 150 that controls the robot body 120.

The robot body 120 includes: a base member 103 as a base portion; a link 104 extending from the base member 103; and a pulley 105 pivotally coupled to a joint 107 that is at a tip of the link 104. The robot body 120 further includes a link 106 fixed to the pulley 105 and rotatably coupled to the link 104 at the joint 107 through the pulley 105.

The robot body 120 further includes an actuator 101 that is a first actuator with one end fixed to the base member 103. The robot body 120 further includes a wire 111 that is a first string-shaped member with one end connected to the other end of the actuator 101 and with the other end connected to the link 106 through the pulley 105.

The robot body 120 further includes an actuator 102 that is a second actuator with one end fixed to the base member 103. The robot body 120 further includes a wire 112 that is a second string-shaped member with one end connected to the other end of the actuator 102 and with the other end connected to the link 106 through the pulley 105. Although the wires 111 and 112 are formed separately, an integral configuration with one wire is also possible.

The actuators 101 and 102 form a drive unit 108. The actuators 101 and 102 are pneumatic artificial muscle actuators illustrated in FIG. 1. Since the artificial muscle actuator generates force only in a contraction direction, the actuator 101 and the wire 111 as well as the actuator 102 and the wire 112 are arranged in an antagonistic manner as illustrated in FIG. 2 in order to position the joint 107 at an arbitrary angle. More specifically, the actuators 101 and 102 are one-joint muscle actuators made of artificial muscle, and contractile force as driving force is generated by contraction. The control device 150 is configured to control the contractile force as the driving force generated by the actuators 101 and 102.

The actuator 101 as the first artificial muscle actuator advances and retreats the wire 111 by contraction and rotates the link 106 in a first rotation direction $R_1$ (counterclockwise in FIG. 2) around the joint 107. The actuator 102 as the second artificial muscle actuator advances and retreats the wire 112 by contraction and rotates the link 106 in a second rotation direction $R_2$ (clockwise in FIG. 2), opposite the first rotation direction $R_1$, around the joint 107. The control device 150 computes and obtains contractile force command values $u_f$ and $u_e$, which are driving force command values of the actuators 101 and 102, and contracts the actuators 101 and 102 according to the contractile force command values $u_f$ and $u_e$.

A contraction amount x of the actuators 101 and 102 (elastic elements) can be expressed as follows by using a moment arm radius r and a joint angle θ.

$$x = r\theta \quad (2)$$

In this case, tensional force $T_f$ and $T_e$ of the wires 111 and 112 can be expressed as follows by using joint angular velocity ω and the contractile force command values $u_f$ and $u_e$ of the actuators 101 and 102.

$$T_f = u_f - k u_f r\theta - c u_f r\omega \quad (3)$$

$$T_e = u_e + k u_e r\theta + c u_e r\omega \quad (4)$$

Since the wires 111 and 112 can transfer force only in the contraction direction, the tensional force $T_f$ and the tensional force $T_e$ are positive numbers. Formulas (3) and (4) are used to derive a equation of motion of the link 106 as follows, wherein a moment of inertia of the link 106 is defined as J, and joint angular acceleration is defined as α.

$$J\alpha = r(u_f - u_e) - kr^2(u_f + u_e)\theta - cr^2(u_f + u_e)\omega \quad (5)$$

Based on Formula (5), it can be recognized that the difference in the contractile force in the first term on the right side provides rotating torque around the joint 107 and that the sum of the contractile force in the second and third terms on the right side provides stiffness and viscosity around the joint 107.

More specifically, in the present first embodiment, the drive unit 108 including the actuators 101 and 102 generates torque around the joint 107 based on the difference in the driving force of the actuators 101 and 102 and provides stiffness to the joint 107 based on the sum of the driving force of the actuators 101 and 102.

A model of the wires 111 and 112 is derived based on the following assumptions.

Assumption (1): The wires 111 and 112 are approximated by one mass point and two springs connected to the mass point. The mass point has translational two-degree-of-freedom in the expansion/contraction direction of the wires 111 and 112 and the direction perpendicular to the expansion/contraction direction.

Assumption (2): Damping effect of string vibration is approximated by a damper that acts on the mass point of the wires 111 and 112.

Assumption (3): Change in the wire length caused by the tensional force is not taken into account.

Assumption (4): Natural frequency in the expansion/contraction direction of the wires 111 and 112 is sufficiently greater than natural frequency of the string vibration.

Assumption (5): Friction between the wires 111, 112 and the pulley 105 is not taken into account.

Figure 3:
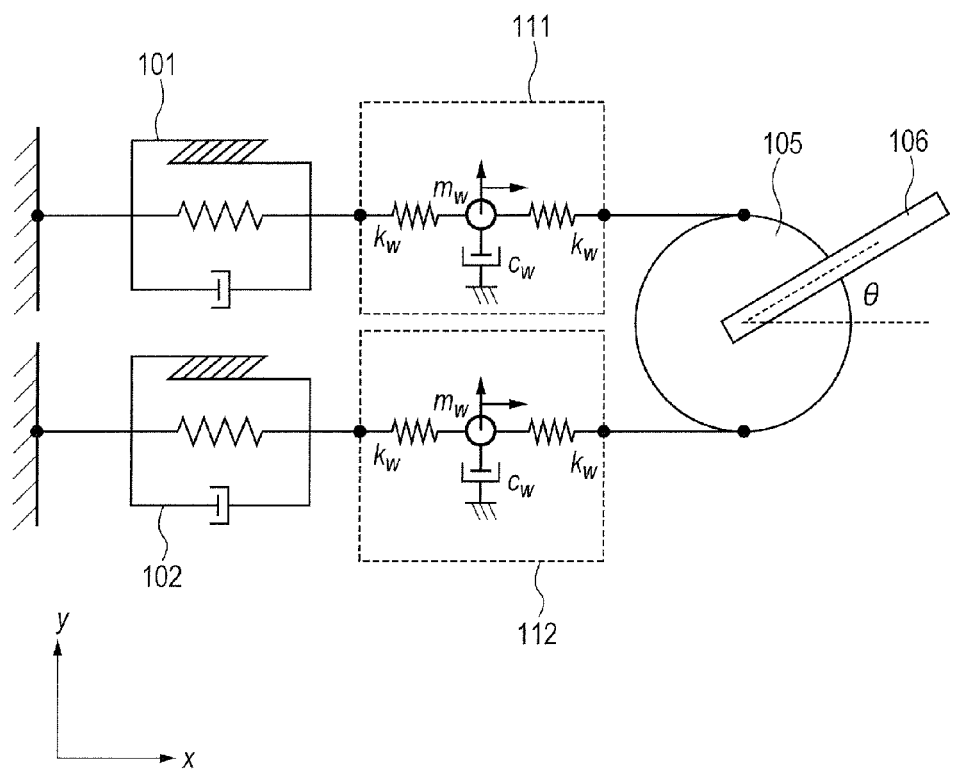
FIG. 3 is a schematic diagram illustrating a robot body according to the first embodiment of the present invention.

FIG. 3 illustrates a model of a wire-driven one-link manipulator derived by using Assumptions (1) to (5). In FIG. 3, $k_w$, $c_w$, and $m_w$ denote stiffness of the wires 111 and 112 in the expansion/contraction direction, an damping coefficient of the string vibration, and mass of the wires 111 and 112, respectively. Based on Assumptions (3) and (4), a value significantly greater than the elasticity of muscle is used as the stiffness $k_w$ of the wires 111 and 112.

(1.2 Control System Design)

Figure 4:
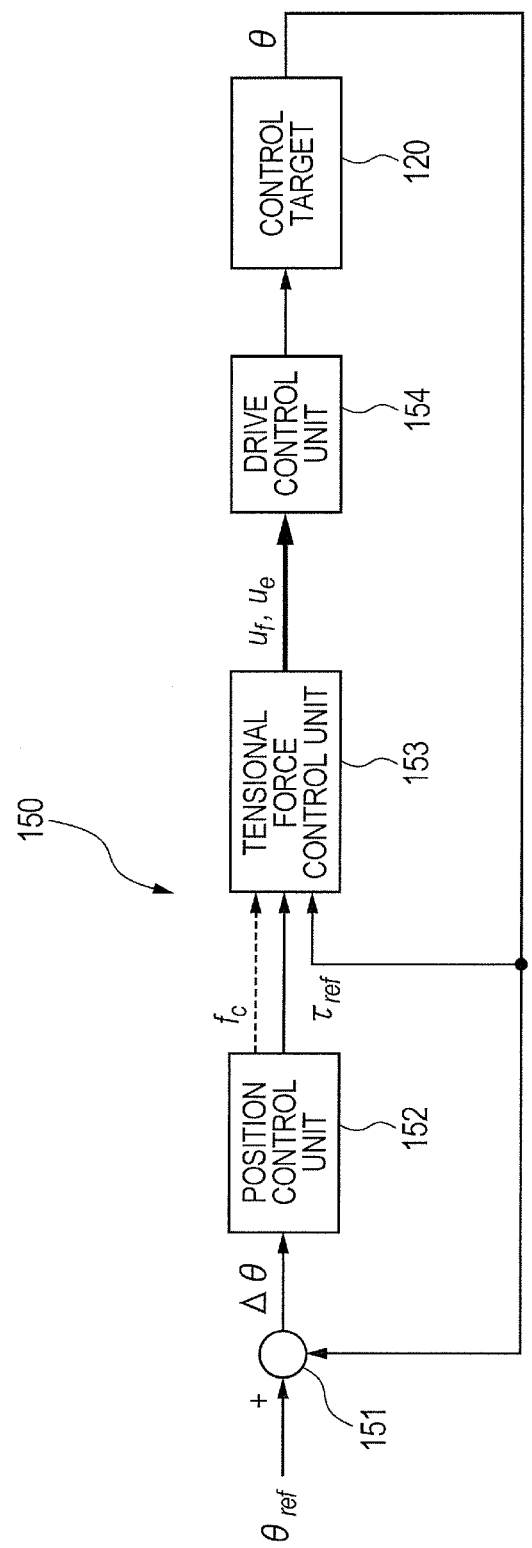
FIG. 4 is a block diagram illustrating a control device of the robot according to the first embodiment of the present invention.

FIG. 4 is a block diagram illustrating a control device of a robot according to the first embodiment of the present invention. A control device 150 includes a subtraction unit 151, a position control unit 152, a tensional force control unit 153, and a drive control unit 154.

The subtraction unit 151 subtracts the joint angle θ from a reference joint angle $\theta_{ref}$ received from an external device, such as a higher-level controller, to calculate angular deviation Δθ. The position control unit 152 calculates a torque command value $\tau_{ref}$ around the joint 107 to reduce the angular deviation Δθ. The tensional force control unit 153 computes the contractile force command values $u_f$ and $u_e$ from the torque command value $\tau_{ref}$ under a condition that the tensional force of the wires 111 and 112 becomes equal to or greater than a tensional force minimum value $T_{min}$ designated in advance and outputs the contractile force command values $u_f$ and $u_e$ to the drive control unit 154.

The drive control unit 154 contracts the actuators 101 and 102 based on the contractile force according to the contractile force command values $u_f$ and $u_e$. The robot body 120 with the one-link arm modeled by Formula (5) is the target of the control.

In this section, a design method of the tensional force minimum value $T_{min}$ will be illustrated first, and then a derivation method of the contractile force command values $u_f$ and $u_e$ will be illustrated. The tensional force minimum value $T_{min}$ is derived from a natural frequency $f_{min}$ of the string vibration necessary to stabilize the control system. Therefore, a method of deriving the natural frequency $f_{min}$ based on a control bandwidth $f_c$ of the position control unit 152 will be illustrated.

(1.2.1 Derivation Method of Control Bandwidth)

In the present first embodiment, a loop transfer function P(s)K(s), which is obtained by multiplying a transfer function P(s) of the robot body 120 as a manipulator by a transfer function K(s) of the position control unit 152, is used to derive the control bandwidth $f_c$. The transfer function P(s) is a transfer function from the torque command value $T_{ref}$ to the joint angle θ, and the torque command value $\tau_{ref}$ is expressed as follows.

$$\tau_{ref} = r(u_f - u_e) \tag{6}$$

Since the sum of the contractile force command values $u_f$ and $u_e$ is the stiffness of the joint 107, the stiffness is expressed as follows by defining the stiffness as U.

$$U = u_f + u_e \tag{7}$$

Based on Formula (5), a Laplace operator s is used to express the transfer function P(s) as follows.

$$P(s) = \frac{1}{Js^2 + cr^2Us + kr^2U} \tag{8}$$

In the present first embodiment, a PID controller is used as the position control unit 152. Therefore, the transfer function K(s) of the position control unit 152 can be expressed as follows by using a derivative gain $K_d$, a proportional gain $K_p$, an integral gain $K_i$ and a time constant $T_d$.

$$K(s) = K_p + \frac{K_i}{s} + \frac{K_d s}{T_d s + 1} \tag{9}$$

Based on Formulas (8) and (9), the loop transfer function P(s)K(s) of the position control system is as follows.

$$P(s)K(s) = \left(\frac{1}{Js^2 + cr^2Us + kr^2U}\right)\left(K_p + \frac{K_i}{s} + \frac{K_d s}{T_d s + 1}\right) \tag{10}$$

In the present first embodiment, the position control unit 152 is designed so that the control bandwidth is higher than the natural frequency of the link 106 generated by the elasticity of muscle. Therefore, the following is obtained by considering only the first-order term in relation to the Laplace operator s in Formula (10).

$$P'(s)K'(s) = \frac{K_d}{Js} \tag{11}$$

Based on Formula (11), the zero crossing frequency, i.e. the control bandwidth $f_c$, of a loop transfer function P'(s)K'(s) is as follows.

$$f_c = \frac{K_d}{2\pi J} \tag{12}$$

(1.2.2 Derivation Method of Minimum Tensional Force Value)

In this section, the natural frequency $f_{min}$ of the string vibration of the wires 111 and 112 for stabilizing the position control unit 152 is derived based on the control bandwidth $f_c$ of the position control unit 152. The tensional force of the wires 111 and 112 when the natural frequency of the string vibration of the wires 111 and 112 is the frequency $f_{min}$ is derived as the tensional force minimum value $T_{min}$.

If the natural frequency $f_{min}$ is lower than the control bandwidth $f_c$, the position control unit 152 excites the string vibration, and the control system becomes unstable. On the other hand, the control bandwidth $f_c$ cannot be equal to or greater than a Nyquist frequency $f_n$ of the position control unit 152. Based on these, the natural frequency $f_{min}$ needs to satisfy the following.

$$f_n > f_{min} > f_c \tag{13}$$

Therefore, based on Formula (13), the control bandwidth $f_c$ and an amplification factor a satisfying the following condition $$\frac{f_n}{f_c} > a > 1 \tag{14}$$

can be used to express the natural frequency $f_{min}$ as follows.

$$f_{min} = a f_c \tag{45}$$

Although the smallest natural frequency that is required to design the stable controller depends on the damping coefficient $c_w$ of the string vibration, Deriving analytical solutions of the natural frequency $f_{min}$ from the damping coefficient $c_w$ is difficult. Therefore, in the present first embodiment, the stability of the control system is checked while gradually increasing the amplification factor a from 1 to derive the amplification factor a.

The tensional force minimum value $T_{min}$ is then computed. The first-order natural frequency f of the string vibration is expressed as follows by using length L of the string, linear mass density μ and tensional force T.

$$f = \frac{1}{2L}\sqrt{\frac{T}{\mu}} \tag{16}$$

Formula (16) is transformed to obtain the following.

$$T_{min} = f(f_{min}) = 4L^2 \mu f_{min}^2 \tag{17}$$

This is used to compute the tensional force minimum value $T_{min}$ of the wires 111 and 112 based on the natural frequency $f_{min}$.

(1.2.3 Derivation Method of Contractile Force)

In the present first embodiment, one of the wire tensional force $T_f$ and $T_e$ illustrated in Formulas (3) and (4) is brought into line with the tensional force minimum value $T_{min}$, and the contractile force command values $u_f$ and $u_e$ are computed to satisfy Formula (6). For the simplification, the viscous element of the artificial muscle actuator is not taken account in the present first embodiment, and only the force generation element and the elastic element are taken into account to derive the contractile force command values $u_f$ and $u_e$.

The magnitude of the tensional force $T_f$ and $T_e$ of the wire is determined. Based on Formulas (3) and (4), the tensional force $T_f$ and $T_e$ can be expressed as follows.

$$T_f = (1 - kr\theta)u_f \tag{1.8}$$

$$T_e = (1 + kr\theta)u_e \tag{19}$$

As described in section 1.1, the artificial muscle actuators 101 and 102 generate only the contractile force, and the wires 111 and 112 can transfer only the force in the contraction direction. Based on Formulas (18) and (19), the joint angle θ needs to satisfy the following in order for the tensional force $T_f$ and $T_e$ and the contractile force command values $u_f$ and $u_e$ to be positive numbers.

$$-\frac{1}{kr} < \theta < \frac{1}{kr} \quad (20)$$

In the present first embodiment, the contractile force command values $u_f$ and $u_e$ are derived on the assumption that the joint angle $\theta$ satisfies Formula (20). If the contractile force command values $u_f$ and $u_e$ satisfy Formula (6), the tensional force $T_e$ can be expressed as follows by using the contractile force command value $u_f$.

$$T_e = (1 + kr\theta)\left(u_f - \frac{\tau_{ref}}{r}\right) \quad (21)$$

The tensional force $T_f$ and $T_e$ is expressed by two formulas, Formulas (18) and (21). Formulas (18) and (21) include three unknown numbers, i.e. the joint angle $\theta$, the torque command value $\tau_{ref}$ and the contractile force command value $u_f$. Therefore, the contractile force command value $u_f$ cannot be uniquely determined.

Therefore, in the present first embodiment, the tensional force of one of the wires 111 and 112 with the smaller one of the tensional force $T_f$ and $T_e$ is set as the tensional force minimum value $T_{min}$ to derive the contractile force command value $u_f$. First, the torque command value $\tau_{ref}$ is fixed to one of positive and negative. A graph indicating the relationship between the contractile force command value $u_f$ and the tensional force $T_f$, $T_e$ is drawn for each of a case in which the joint angle $\theta$ is positive and a case in which the joint angle $\theta$ is negative. The graphs are used to determine the magnitude of the tensional force $T_f$ and $T_e$.

(i) When Torque Command Value $\tau_{ref}$ is Positive

FIGS. 5A and 5B illustrate the relationships between the contractile force command value $u_f$ and the tensional force $T_f$, $T_e$ when the joint angle $\theta$ is positive and when the joint angle $\theta$ is negative. In FIGS. 5A to 5D, solid lines denote the relationships between the contractile force command value $u_f$ and the tensional force $T_e$, and dashed lines denote the relationships between the contractile force command value $u_f$ and the tensional force $T_f$. Based on FIG. 5A and Formulas (18) and (21), it can be recognized that the slope of the straight line indicating the tensional force $T_f$ is smaller than the slope of the straight line indicating the tensional force $T_e$ if the joint angle $\theta$ is positive. Based on Formulas (20) and (21), it can be recognized that an intercept between the straight line indicating the tensional force $T_e$ and an X axis is positive. As a result, a contractile force command value $u_0$ that equalizes the tensional force $T_f$ and the tensional force $T_e$ exists, and $u_0$ can be expressed as follows based on Formulas (18) and (21).

$$u_0 = \frac{1 + kr\theta}{2kr^2\theta}\tau_{ref} \quad (22)$$

When the contractile force command value $u_0$ is provided by Formula (22), the wire tensional force $T_0$ is as follows based on Formula (18).

$$T_0 = \frac{1 - k^2r^2\theta^2}{2kr^2\theta}\tau_{ref} \quad (23)$$

Therefore, if the tensional force minimum value $T_{min}$ satisfies the following, $$T_{min} \geq T_0 \quad (24)$$

the tensional force $T_f$ is smaller than the tensional force $T_e$ based on FIG. 5A. Therefore, the following can be set.

$$T_f = T_{min} \quad (25)$$

If the tensional force minimum value $T_{min}$ satisfies the following, $$T_{min} < T_0 \quad (26)$$

the tensional force $T_e$ is smaller than the tensional force $T_f$. Therefore, the following can be set.

$$T_e = T_{min} \quad (27)$$

On the other hand, if the joint angle $\theta$ is negative, it can be recognized from FIG. 5B and Formulas (18) and (21) that the slope of the straight line indicating the tensional force $T_e$ is smaller than the slope of the straight line indicating the tensional force $T_f$. It can also be recognized from Formulas (20) and (21) that the intercept between the straight line indicating the tensional force $T_e$ and the X axis is positive. Since the tensional force $T_e$ is smaller than the tensional force $T_f$, the tensional force $T_e$ can be set to satisfy Formula (27).

(ii) When Torque Command Value $\tau_{ref}$ is Negative

FIGS. 5C and 5D illustrate the relationships between the contractile force command value $u_f$ and the tensional force $T_f$, $T_e$ when the joint angle $\theta$ is positive and when the joint angle $\theta$ is negative.

Based on FIG. 5C and Formulas (18) and (21), it can be recognized that the slope of the straight line indicating the tensional force $T_f$ is smaller than the slope of the straight line indicating the tensional force $T_e$ if the joint angle $\theta$ is positive. Based on Formulas (20) and (21), it can be recognized that an intercept between the straight line indicating the tensional force $T_e$ and a Y axis is positive. Since the tensional force $T_f$ is smaller than the tensional force $T_e$, the tensional force $T_f$ can be set to satisfy Formula (25).

On the other hand, based on FIG. 5D and Formulas (18) and (21), it can be recognized that the slope of the straight line indicating the tensional force $T_e$ is smaller than the slope of the straight line indicating the tensional force $T_f$ if the joint angle $\theta$ is negative. Based on Formulas (20) and (21), it can be recognized that the intercept between the straight line indicating the tensional force $T_e$ and the Y axis is positive. As a result, the tensional force $T_f$ and the tensional force $T_e$ are equal at the contractile force command value $u_0$ expressed by Formula (22), and the tensional force $T_0$ at this time is expressed by Formula (23). Therefore, if the tensional force minimum value $T_{min}$ satisfies Formula (24), the tensional force $T_f$ is smaller than the tensional force $T_e$ as illustrated in FIG. 5D, and the tensional force $T_f$ can be set as in Formula (25). If the tensional force minimum value $T_{rain}$ satisfies Formula (26), the tensional force $T_e$ is smaller than the tensional force $T_f$, and the tensional force $T_e$ can be set as in Formula (27).

(iii) Computation Method of Contractile Force Command Values $u_f$ and $u_e$

If the tensional force $T_f$ is smaller than the tensional force $T_e$, the tensional force $T_f$ can be brought into line with the tensional force minimum value $T_{min}$. Therefore, the contractile force command values $u_f$ and $u_e$ are obtained as follows based on Formulas (18) and (21).

$$u_f = \frac{T_{min}}{1 - kr\theta} \quad (28)$$

-continued $$u_e = \frac{T_{min}}{1 - kr\theta} - \frac{\tau_{ref}}{r} \quad (29)$$

On the other hand, if the tensional force $T_e$ is smaller than the tensional force $T_f$, the tensional force $T_e$ can be brought into line with the tensional force minimum value $T_{min}$. Therefore, the contractile force command values $u_f$ and $u_e$ are obtained as follows by using Formulas (18) and (21).

$$u_f = \frac{T_{min}}{1 + kr\theta} + \frac{\tau_{ref}}{r} \quad (30)$$

$$u_e = \frac{T_{min}}{1 + kr\theta} \quad (31)$$

(1.2.4 Block Diagram of Tensional Force Control Unit)

Figure 6:
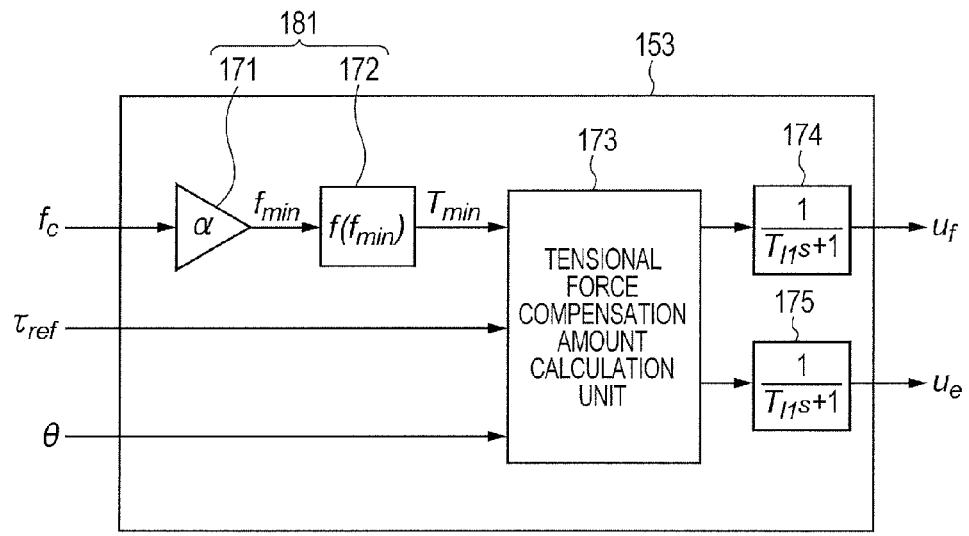
FIG. 6 is a block diagram illustrating a tensional force control unit according to the first embodiment of the present invention.

FIG. 6 illustrates a block diagram of the tensional force control unit 153. The tensional force control unit 153 includes: a tensional force minimum value calculation unit 181; a tensional force compensation amount computation unit 173 as a driving force command value calculation unit (contractile force command value calculation unit) 173; and low-pass filters 174 and 175.

The tensional force minimum value calculation unit 181 includes amplification units 171 and 172. The amplification unit 171 uses Formula (14) to compute the natural frequency $f_{min}$ that is a value greater than the control bandwidth $f_c$ and smaller than the Nyquist frequency $f_n$. The amplification unit 172 uses Formula (16) to compute the tensional force minimum value $T_{min}$ based on the natural frequency $f_{min}$.

The tensional force compensation amount computation unit 173 receives the tensional force minimum value $T_{min}$, the torque command value $\tau_{ref}$ and the joint angle $\theta$ to compute the contractile force command values $u_f$ and $u_e$.

Figure 7:
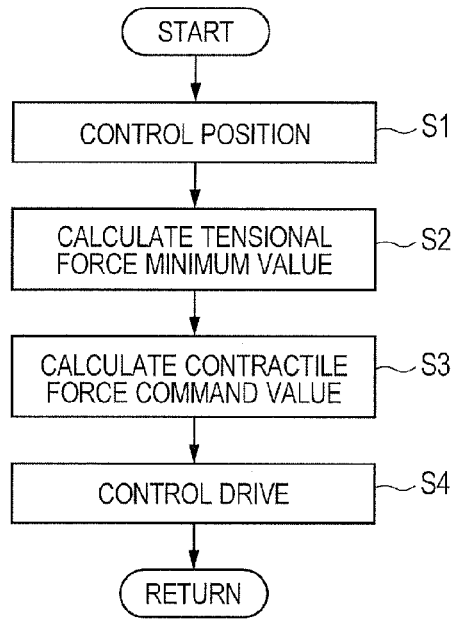
FIG. 7 is a flow chart illustrating a robot control method by the control device of the robot according to the first embodiment of the present invention.

Hereinafter, operation of the components of the control device 150 will be described in detail. FIG. 7 is a flow chart illustrating a robot control method by the control device of the robot according to the first embodiment of the present invention.

Based on the angular deviation $\Delta\theta$ of the joint angle $\theta$ relative to the reference joint angle $\theta_{ref}$ received from the outside, the position control unit 152 calculates the torque command value $\tau_{ref}$ around the joint 107 (S1: position control step).

The tensional force minimum value calculation unit 181 obtains the natural frequency $f_{min}$ satisfying $f_n > f_{min} > f_c$ and calculates the tensional force minimum value $T_{min}$ based on a relational expression of $T_{min} = 4 \times L^2 \times \mu \times f_{min}^2$ (S2: tensional force minimum value calculation step). The tensional force compensation amount computation unit 173 uses the tensional force minimum value $T_{min}$, the joint angle $\theta$ and the torque command value $\tau_{ref}$ to calculate the contractile force command values $u_f$ and $u_e$ to bring the tensional force of one of the wires 111 and 112 with the smaller tensional force into line with the tensional force minimum value $T_{min}$ (S3: contractile force command value calculation step).

The drive control unit 154 generates contractile force corresponding to the contractile force command values $u_f$ and $u_e$ obtained in step S3 (contractile force command value calculation step as driving force command value calculation step) on the actuators 101 and 102 (S4: drive control step).

Figure 8:
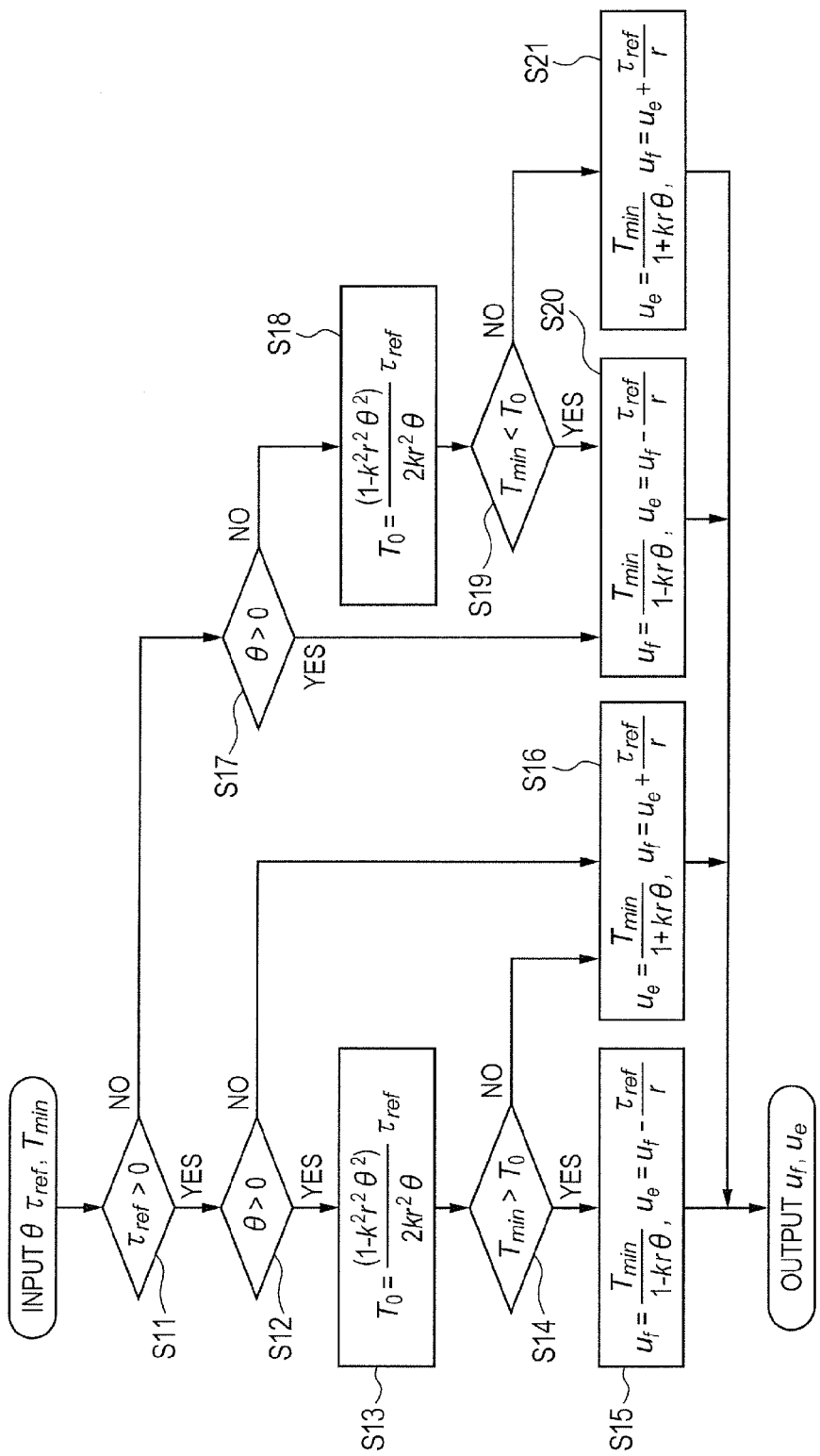
FIG. 8 is a flow chart illustrating a computation process in a tensional force compensation amount computation unit according to the first embodiment of the present invention.

FIG. 8 is a flow chart illustrating the computation process by the tensional force compensation amount computation unit. Hereinafter, the computation process of the tensional force compensation amount computation unit 173 in step S3 (FIG. 7) will be specifically described. The tensional force compensation amount computation unit 173 determines whether $\tau_{ref} > 0$ (S11). If $\tau_{ref} > 0$ (S11: Yes), the tensional force compensation amount computation unit 173 determines whether $\theta > 0$ (S12). If $\theta > 0$ (S12: Yes), the tensional force compensation amount computation unit 173 calculates the tensional force $T_0$ based on Formula (23) (S13). The tensional force compensation amount computation unit 173 determines whether $T_{min} > T_0$ (S14). If $T_{min} > T_0$ (S14: Yes), the tensional force compensation amount computation unit 173 calculates the contractile force command values $u_f$ and $u_e$ based on Formulas (28) and (29) (S15).

If not $\theta > 0$ (S12: No) or if not $T_{min} > T_0$ (S14: No), the tensional force compensation amount computation unit 173 calculates the contractile force command values $u_f$ and $u_e$ based on Formulas (30) and (31) (S16).

If not $\tau_{ref} > 0$ (S11: No), the tensional force compensation amount computation unit 173 determines whether $\theta > 0$ (S17). If not $\theta > 0$ (S17: No), the tensional force compensation amount computation unit 173 calculates the tensional force $T_0$ based on Formula (23) (S18). The tensional force compensation amount computation unit 173 determines whether $T_{min} < T_0$ (S19).

If $T_{min} < T_0$ (S19: Yes) or if $\theta > 0$ (S17: Yes), the tensional force compensation amount computation unit 173 calculates the contractile force command values $u_f$ and $u_e$ based on Formulas (28) and (29) (S20).

If not $T_{min} < T_0$ (S19: No), the tensional force compensation amount computation unit 173 calculates the contractile force command values $u_f$ and $u_e$ based on Formulas (30) and (31) (S21).

If the tensional force $T_f$ and $T_e$ is near the tensional force minimum value $T_{min}$, the contractile force command values illustrated in Formulas (28) and (29) and the contractile force command values illustrated in Formulas (30) and (31) frequently switch. This may cause a chattering phenomenon that generates vibrational control input.

Therefore, first-order lag filters are used as the low-pass filters 174 and 175 in the present first embodiment to reduce high-frequency components of the contractile force command values $u_f$ and $u_e$. A transfer function $L_1(s)$ of the low-pass filters 174 and 175 is expressed as follows by using a time constant $T_{11}$.

$$L_1(s) = \frac{1}{T_{11}s + 1} \quad (32)$$

(1.3 Simulation)

The control system derived in the previous section is used to perform a positioning simulation. In the present first embodiment, the control bandwidth $f_c$ is 25 Hz, the amplification factor a is 2, and the natural frequency $f_{min}$ is 50 Hz. The linear mass density $\mu$ is $2.5 \times 10^{-4}$ kg/m, the wire length L is 0.2 m, and the tensional force minimum value $T_{min}$ is 4 N. The time constant $T_{11}$ of the low-pass filters 174 and 175 is $4.5 \times 10^{-3}$ sec. For the reference joint angle $\theta_{ref}$, a ramp signal that increases from 0 rad to 0.85 rad between 0.2 sec and 0.7 sec is provided. To confirm that the control system is stable even if there is a string vibration, a pulse disturbance of 1.5 N is applied to the wires 111 and 112 between time 0.5 sec and 0.51 sec.

Figure 9A:
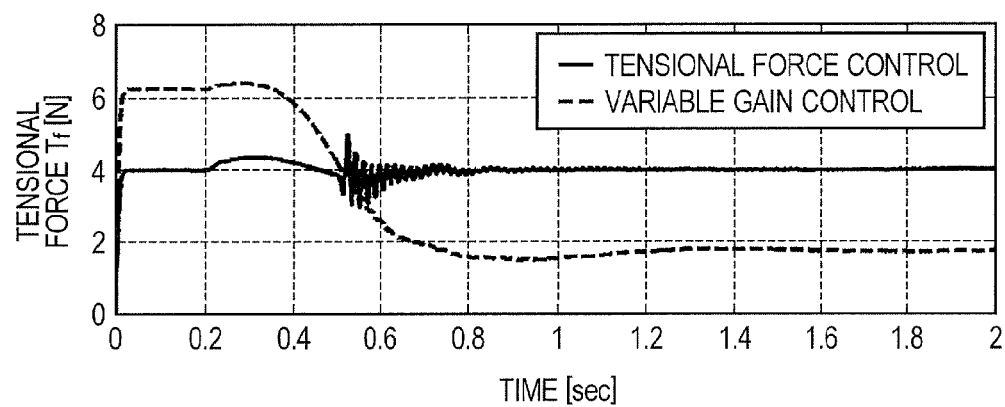
FIGS. 9A and 9B are diagrams illustrating simulation results according to the first embodiment of the present invention.
Figure 9B:
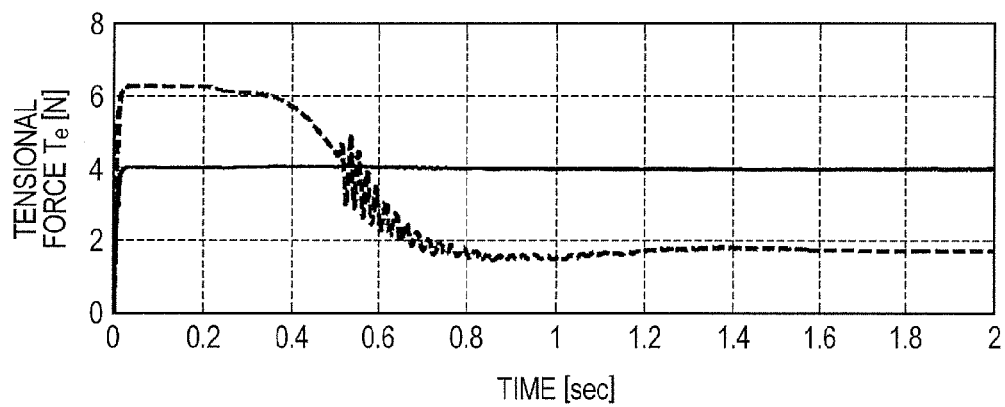
Figure 10:
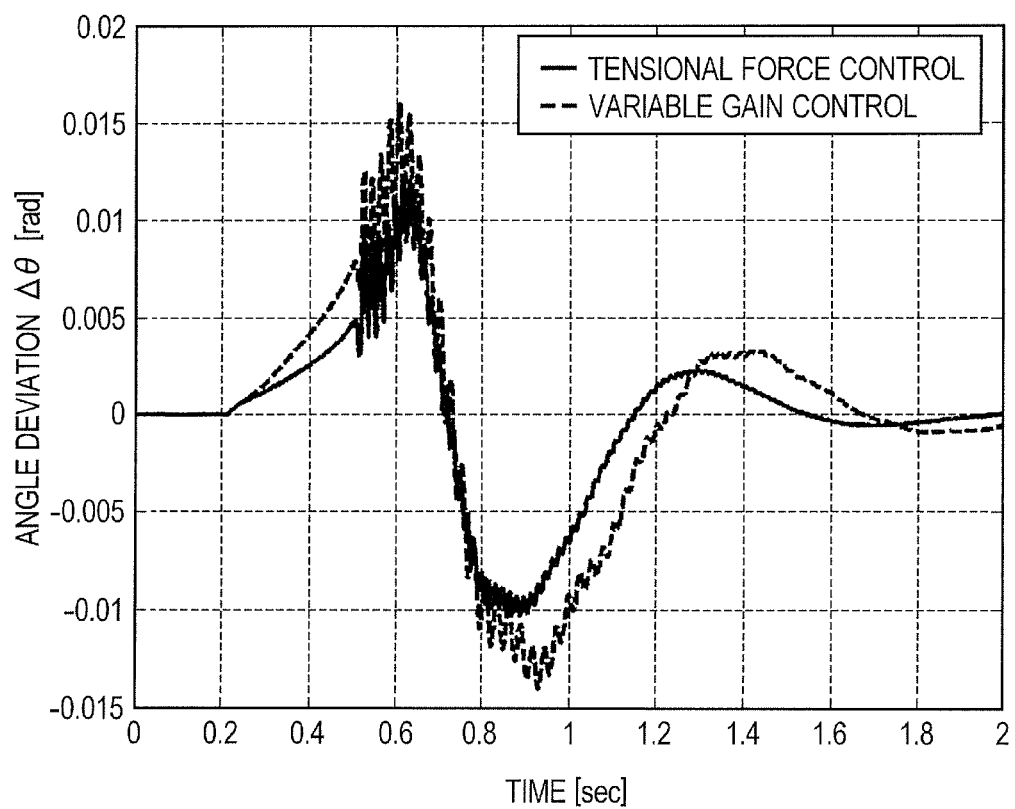
FIG. 10 is a diagram illustrating a simulation result according to the first embodiment of the present invention.

FIGS. 9A and 9B illustrate responses of the wire tensional force $T_f$ and the wire tensional force $T_e$, respectively. FIG. 10 illustrates a response of the angular deviation $\Delta\theta$. In FIGS.

9A, 9B and 10, solid lines denote responses by the control device 150 including the position control unit 152 and the tensional force control unit 153 at a constant gain, and dashed lines denote responses by the variable gain controller of Japanese Patent Application Laid-Open No. 2006-35325 in which the tensional force of the wires 111, 112 and the control bandwidth are proportional. In a simulation of performing only the position control at a constant gain without performing the tensional force control, the reduction in the tensional force reduces the natural frequency of the string vibration, and the control system becomes unstable. Therefore, responses are not illustrated.

Based on FIGS. 9A and 9B, it can be recognized that the tensional force $T_f$ and the tensional force $T_e$ are both equal to or greater than the tensional force minimum value 4 N in the tensional force control of the present first embodiment. This is because the tensional force of the wires 111 and 112 is controlled to be equal to or greater than the tensional force minimum value $T_{min}$ in the tensional force control. This maintains the natural frequency of the string vibration to be equal to or greater than the natural frequency $f_{min}$, and the position control system is also stable after 0.5 sec at which the string vibration occurs. Since the control bandwidth $f_c$ is maintained, highly accurate positioning is possible. On the other hand, the tensional force of the wires is not taken into account to control the contractile force command values $u_f$ and $u_e$ in the variable gain control. Therefore, the tensional force is reduced to 2 N or less after 0.7 sec. Since the control bandwidth of the variable gain control is in proportion to the tensional force, the control bandwidth of the variable gain control after 0.7 sec is lower than the control bandwidth $f_c$. Therefore, as illustrated in FIG. 10, the angular deviation $\Delta\theta$ based on the variable gain control is greater than that in the tensional force control. As a result, it can be recognized that the tensional force control unit 153 prevents the reduction in the tensional force to stabilize the control system to realize highly accurate positioning by the position control unit 152 with a wide control bandwidth in the present first embodiment.

As described, the tensional force of the wires 111 and 112 is controlled so that the natural frequency of the string vibration exceeds the control bandwidth $f_c$ of the position control unit 152 in the present first embodiment. As a result, the control system is stable even if the position control unit 152 with a wide control bandwidth resistant to disturbance is used, and highly accurate positioning control is possible.

In the tensional force control, the tensional force of the wires 111 and 112 is increased to improve the natural frequency of the wire vibration. Therefore, if the variable stiffness element with the joint stiffness proportional to the tension force of the wires 111 and 112 is used as in the past, the tensional force control may increase the joint stiffness. However, the tensional force is controlled to the minimum level necessary to stabilize the control system based on the control bandwidth of the position control unit 152 in the present first embodiment. Therefore, the joint stiffness is not excessively increased, and the flexibility of the joint is not lost.

Second Embodiment

A robot according to a second embodiment of the present invention will be described. In the present second embodiment, a configuration of a robot body is similar to that of the first embodiment. In the following description, the same reference numerals as those in FIG. 2 of the first embodiment will be used for the configuration of the components of the robot body, and detailed description will be omitted.

In the tensional force control of the first embodiment, the contractile force command values $u_f$ and $u_e$ are uniquely computed based on the tensional force minimum value $T_{min}$, the joint angle $\theta$ and the torque command value $\tau_{ref}$. Therefore, a sum U of the contractile force command values, i.e. the stiffness of the joint and the tensional force $T_f$ and $T_e$, cannot be independently controlled. On the other hand, the tensional force $T_f$ and $T_e$ may be greater than the tensional force minimum value $T_{min}$ without performing the tensional force control, depending on the size of the joint angle $\theta$ and the torque command value $\tau_{ref}$.

Therefore, in the present second embodiment, stiffness control is performed to control the contractile force command values $u_f$ and $u_e$ to realize desired joint stiffness if the tensional force $T_f$ and $T_e$ is greater than the tensional force minimum value $T_{min}$. The tensional force control is performed only if the tensional force $T_f$ and $T_e$ is smaller than the tensional force minimum value $T_{min}$.

(2.1 Control System Design)

As illustrated in Formula (5) of the first embodiment, the joint stiffness U is in proportion to the sum of the contractile force command values $u_f$ and $u_e$. Therefore, in the stiffness control, the contractile force is derived under conditions that a sum of contractile force command values $u_f''$ and $u_e''$ coincides with a stiffness command value $U_{ref}$ and that a product of a difference and a moment arm radius r coincides with the torque command value $\tau_{ref}$. In this case, the stiffness command value $U_{ref}$ and the torque command value $\tau_{ref}$ are expressed as follows.

$$\tau_{ref} = r(u_f'' - u_e'') \quad (33)$$

$$U_{ref} = u_f'' + u_e'' \quad (34)$$

Therefore, Formulas (33) and (34) are solved for the contractile force command values $u_f''$ and $u_e''$ to obtain the following.

$$u_f'' = \frac{U_{ref}}{2} + \frac{\tau_{ref}}{2r} \quad (35)$$

$$u_e'' = \frac{U_{ref}}{2} - \frac{\tau_{ref}}{2r} \quad (36)$$

Based on Formulas (35) and (36), it can be recognized that the contractile force for realizing desired joint stiffness can be derived by simple computation in the stiffness control of the present second embodiment.

In the switch control for switching the stiffness control and the tensional control, contractile force command values $u_f'$ and $u_e'$ based on the tensional force control are output if at least one of the tensional force $T_f$ of the wire 111 and the tensional force $T_e$ of the wire 112 is smaller than the tensional force minimum value $T_{min}$. On the other hand, the contractile force command values $u_f''$ and $u_e''$ based on the stiffness control are output if the tensional force $T_f$ and the tensional force $T_e$ are greater than the tensional force minimum value $T_{min}$. Although a tensional force sensor is used to directly measure the wire tensional force $T_f$ and $T_e$ used for the switch control in the present second embodiment, the joint angle $\theta$ and the contractile force command values $u_f$ and $u_e$ of the previous sample may be used to estimate the wire tensional force $T_f$ and $T_e$ based on Formulas (3) and (4).

Figure 11:
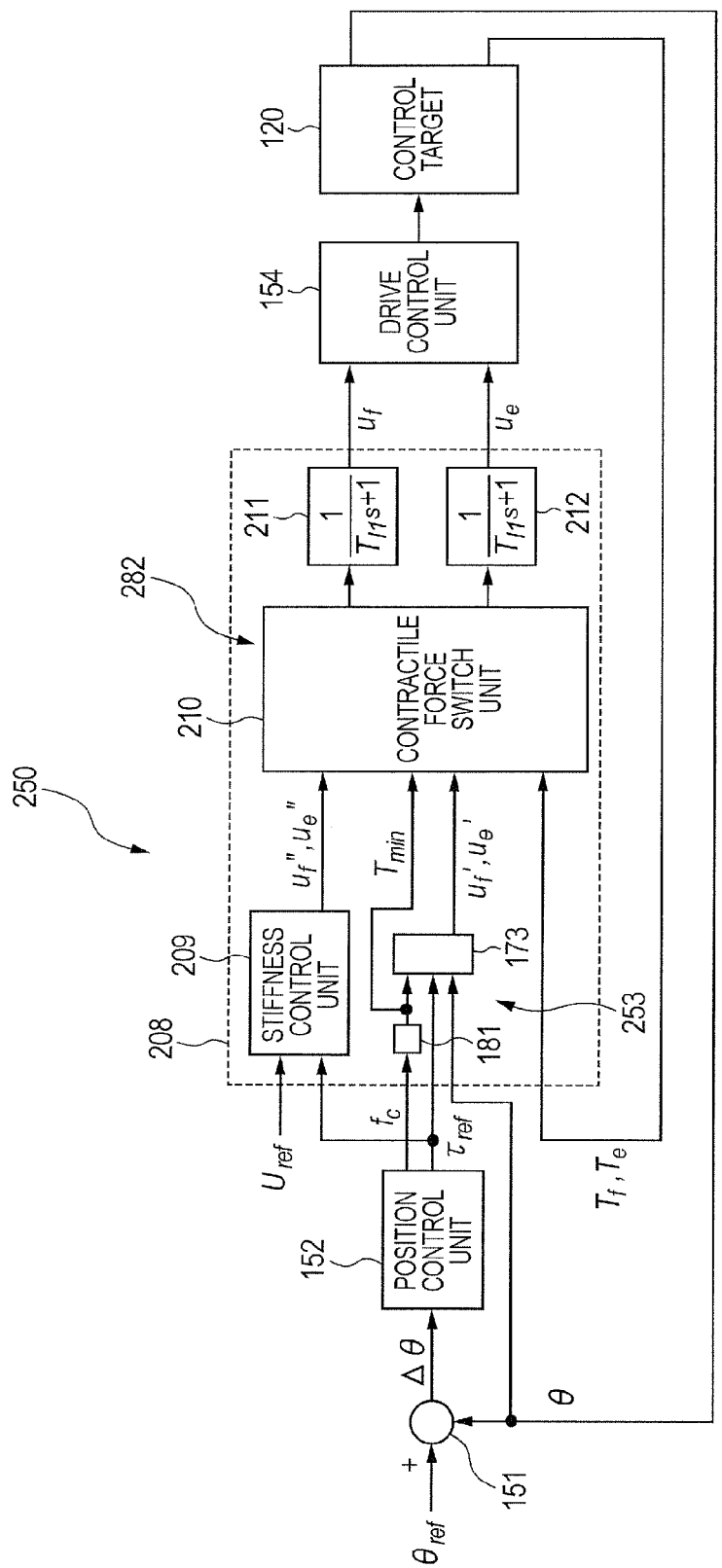
FIG. 11 is a block diagram illustrating a control device of a robot according to a second embodiment of the present invention.

FIG. 11 is a block diagram illustrating a control device of the robot according to the second embodiment of the present invention. A control device 250 of the present second embodiment includes the subtraction unit 151, the position control unit 152 and the drive control unit 154 as in the first embodiment. The control device 250 further includes a tensional force/stiffness control unit 208.

The tensional force/stiffness control unit 208 includes the tensional force minimum value calculation unit 181 as in the first embodiment and further includes a driving force command value calculation unit 282 and low-pass filters 211 and 212.

The driving force command value calculation unit 282 includes the tensional force compensation amount computation unit 173 as in the first embodiment, a stiffness control unit 209 and a contractile force switch unit 210. The tensional force minimum value calculation unit 181 and the tensional force compensation amount computation unit 173 form the tensional force control unit 253.

The stiffness control unit 209 receives input of the stiffness command value $U_{ref}$ from an external device and receives input of the torque command value $\tau_{ref}$ from the position control unit 152. The stiffness control unit 209 uses the stiffness command value $U_{ref}$ and the torque command value $\tau_{ref}$ to calculate temporary contractile force command values $u_f''$ and $u_e''$ to bring the stiffness of the joint 107 (FIG. 2) into line with the stiffness command value $U_{ref}$.

The tensional force compensation amount computation unit 173 calculates the temporary contractile force command values $u_f'$ and $u_e'$ based on the calculation process as in the first embodiment.

Figure 12:
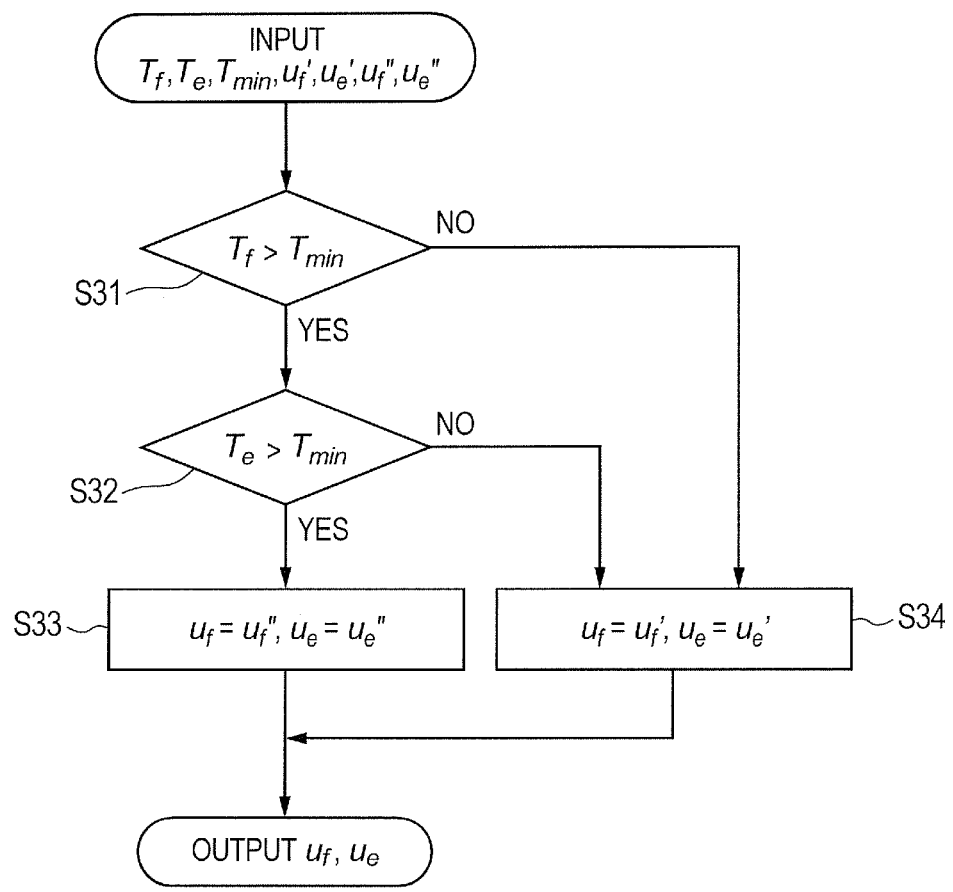
FIG. 12 is a flow chart illustrating a computation process in a contractile force switch unit according to the second embodiment of the present invention.

FIG. 12 is a flow chart illustrating a computation process by the contractile force switch unit. The contractile force switch unit 210 determines whether the tensional force $T_f$ of the wire 111 is greater than the tensional force minimum value $T_{min}$ (whether $T_f > T_{min}$) (S31).

If the contractile force switch unit 210 determines that the tensional force $T_f$ of the wire 111 is greater than the tensional force minimum value $T_{min}$ (S31: Yes), the contractile force switch unit 210 determines whether the tensional force $T_e$ of the wire 112 is greater than the tensional force minimum value $T_{min}$ (whether $T_e > T_{min}$) (S32).

If the contractile force switch unit 210 determines that the tensional force $T_e$ of the wire 112 is greater than the tensional force minimum value $T_{min}$ (S32: Yes), the contractile force switch unit 210 sets $u_f = u_f''$ and $u_e = u_e''$ (S33).

If the contractile force switch unit 210 determines that the tensional force $T_f$ of the wire 111 is not greater than the tensional force minimum value $T_{min}$ (S31: No) or determines that the tensional force $T_e$ of the wire 112 is not greater than the tensional force minimum value $T_{min}$ (S32: No), the contractile force switch unit 210 sets $u_f = u_f'$ and $u_e = u_e'$ (S34).

More specifically, if the tensional force of at least one of the wires 111 and 112 is smaller than the tensional force minimum value $T_{min}$, the driving force command value calculation unit 282 calculates the contractile force command values that bring the tensional force of one of the wires 111 and 112 with the smaller tensional force into line with the tensional force minimum value $T_{min}$. In other words, if the tensional force of at least one of the wires 111 and 112 is smaller than the tensional force minimum value $T_{min}$, the driving force command value calculation unit 282 sets the temporary contractile force command values $u_f'$ and $u_e'$ as the contractile force command values $u_f$ and $u_e$.

If the tensional force of both of the wires 111 and 112 is greater than the tensional force minimum value $T_{min}$, the driving force command value calculation unit 282 uses the stiffness command value $U_{ref}$ and the torque command value $\tau_{ref}$ to calculate the contractile force command values to bring the stiffness of the joint into line with the stiffness command value $U_{ref}$. In other words, if the tensional force of both of the wires 111 and 112 is greater than the tensional force minimum value $T_{min}$, the driving force command value calculation unit 282 sets the temporary contractile force command values $u_f''$ and $u_e''$ as the contractile force command values $u_f$ and $u_e$.

In the present second embodiment, although the temporary contractile force command values $u_f'$ and $u_e'$ are set as the contractile force command values $u_f$ and $u_e$ if $T_f = T_{min}$ or $T_e = T_{min}$, the temporary contractile force command values $u_f''$ and $u_e''$ may be set as the contractile force command values $u_f$ and $u_e$.

In the switch control, the control input of the tensional force control and the stiffness control frequently switches when the tensional force $T_f$ and the tensional force $T_e$ are near the tensional force minimum value $T_{min}$. This causes a chattering phenomenon in which the control input is vibrational. Therefore, first-order lag filters are used as the low-pass filters 211 and 212 to reduce high-frequency components of the control input. A transfer function $L_2(s)$ of the low-pass filters 211 and 212 is expressed as follows by using a time constant $T_{12}$.

$$L_2(s) = \frac{1}{T_{12}s + 1} \quad (37)$$

Unlike in the first embodiment, the control device 250 of the present second embodiment does not include the low-pass filters 174 and 175. This is because the low-pass filters 211 and 212 can reduce the high-frequency components of the contractile force command values $u_f'$ and $u_e'$.

(2.2 Simulation)

The control system derived in the previous section is used to perform a positioning simulation. Physical parameters of the wires 111 and 112 and control parameters of the position control unit 152 and the tensional force control unit 253 are the same as in the first embodiment.

The time constant $T_{12}$ of the low-pass filters 211 and 212 is $4.5 \times 10^{-3}$ sec, and the stiffness command value $U_{ref}$ is 12.5 N. For the reference joint angle $\theta_{ref}$, a ramp signal that increases from 0 rad to 0.6 rad between 0.2 sec and 0.7 sec is provided.

Figure 13A:
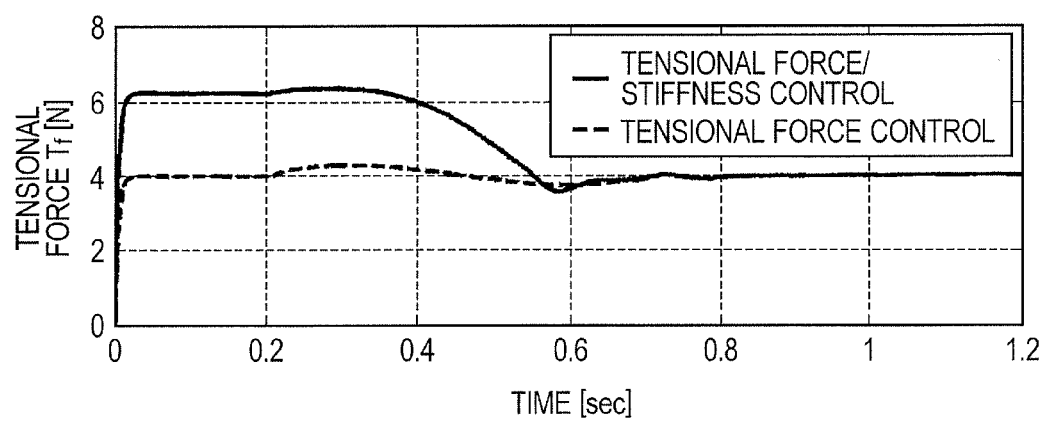
FIGS. 13A and 13B are diagrams illustrating simulation results according to the second embodiment of the present invention.
Figure 13B:
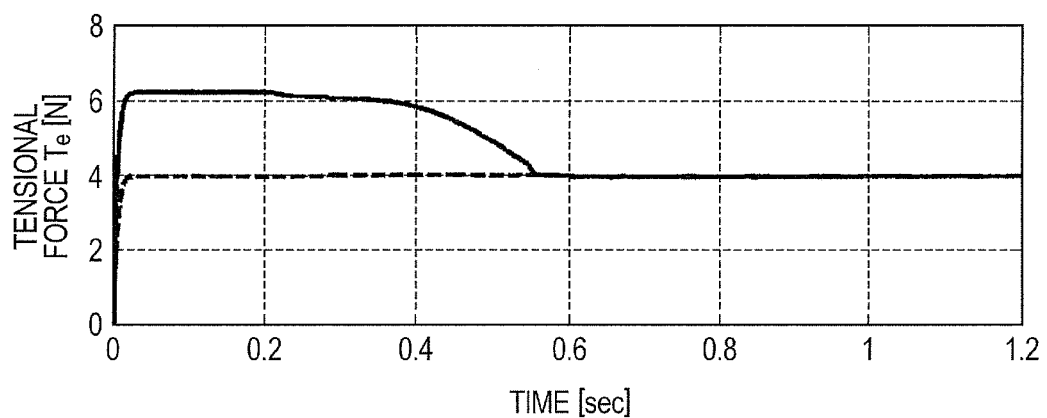
Figure 14:
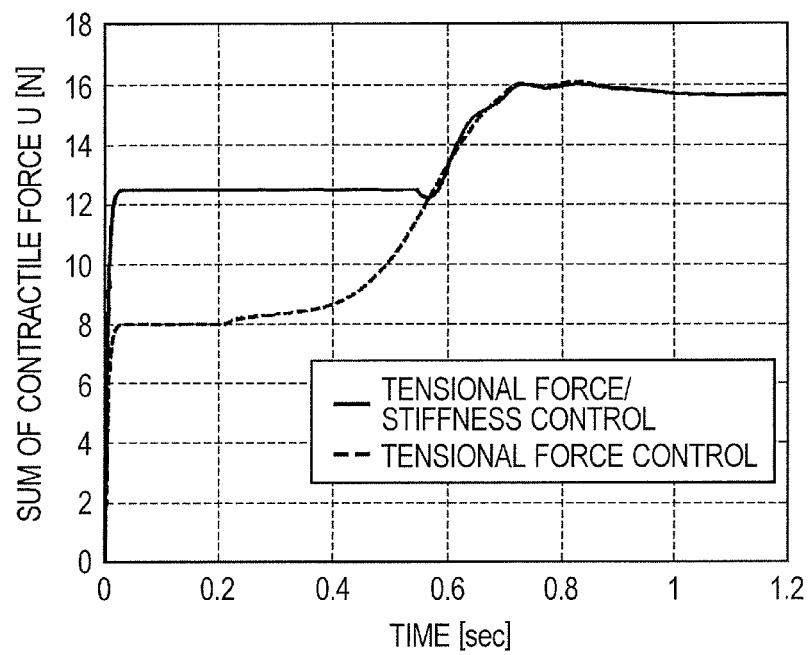
FIG. 14 is a diagram illustrating a simulation result according to the second embodiment of the present invention.
Figure 15:
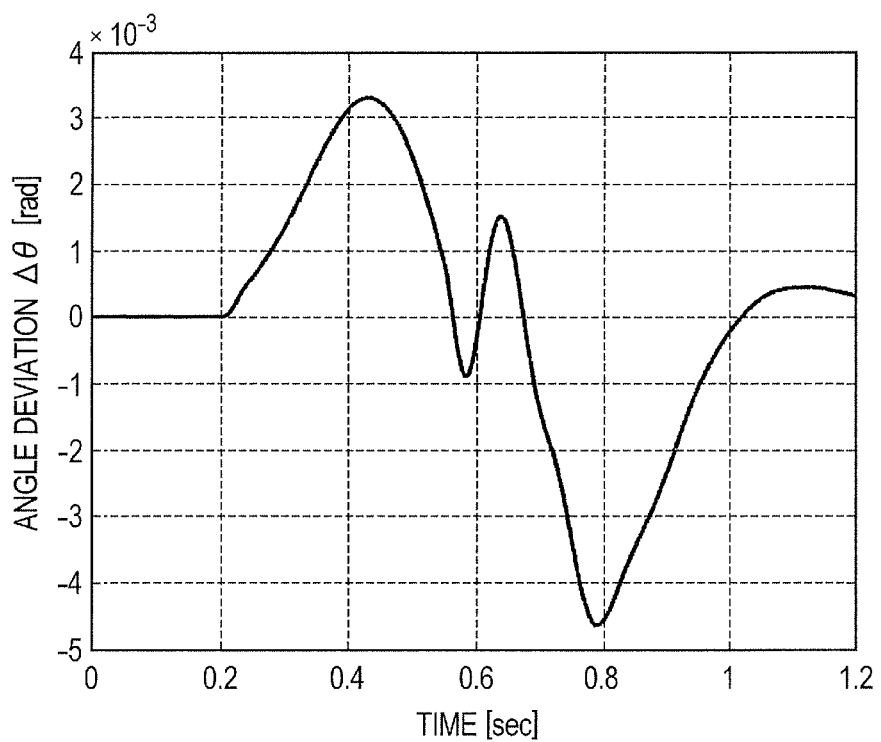
FIG. 15 is a diagram illustrating a simulation result according to the second embodiment of the present invention.

FIGS. 13A and 13B illustrate responses of the tensional force $T_f$ of the wire 111 and the tensional force $T_e$ of the wire 112, respectively. FIG. 14 illustrates a response of the sum U of the contractile force. In FIGS. 13A, 13B and 14, solid lines denote responses in the tensional force/stiffness control of the present second embodiment, and dashed lines denote responses of the control system of the first embodiment that only performs the tensional force control. FIG. 15 denotes a response of the angular deviation $\Delta\theta$ in the tensional force/stiffness control of the present second embodiment.

As illustrated in FIGS. 13A and 13B, the tensional force $T_f$ and the tensional force $T_e$ are greater than the tensional force minimum value 4 N until time 0.6 sec. In the tensional force/stiffness control, the stiffness control for setting the sum U of the contractile force as the stiffness command value $U_{ref}$ is performed if the tensional force $T_f$ and the tensional force $T_e$ are greater than the tensional force minimum value $T_{min}$. Therefore, it can be recognized that the joint stiffness can be controlled to coincide with the stiffness command value $U_{ref}$ until the time 0.6 sec as illustrated in FIG. 14. On the other hand, in the tensional force/stiffness control, it can be recognized that the tensional force $T_f$ and the tensional force $T_e$ coincide with the tensional force minimum value 4 N after 0.6 sec, as illustrated in FIGS. 13A and 13B. This is because in the tensional force/stiffness control, the tensional force control for setting the smaller one of the tensional force $T_f$ and the tensional force $T_e$ as the tensional force minimum value $T_{min}$ is performed if one of the tensional force $T_f$ and the tensional force $T_e$ is smaller than the tensional force minimum value $T_{min}$. As illustrated in FIG. 14, the control of the joint stiffness is switched to the tensional force control after 0.6 sec. Therefore, the sum U of the contractile force is greater than the stiffness command value $U_{ref}$. However, it can be recognized from FIG. 15 that the tensional force control prevents the control system from becoming unstable, and the angular deviation is converged to 0 rad. On the other hand, in the control system of the first embodiment in which only the tensional force control is performed, the contractile force is not computed by taking the joint stiffness into account. Therefore, the sum U of the contractile force cannot be controlled to coincide with the stiffness command value $U_{ref}$ not only after 0.6 sec, but also between 0 sec and 0.6 sec. As a result, it can be recognized that the tensional force/stiffness control of the present second embodiment can control the stiffness of the joint to coincide with the stiffness command value if the tensional force $T_f$ and $T_e$ is greater than the tensional force minimum value $T_{min}$.

More specifically, in the present second embodiment, the tensional force control as in the first embodiment is performed only if the control system becomes unstable as a result of the reduction in the tensional force of the wires 111 and 112, and the tensional force is controlled to realize the desired joint stiffness if the control system is stable. As a result, in the tensional force control method of the present second embodiment, the flexibility of the joint is not significantly lost even if the position control unit 152 with a wide control bandwidth is used. Since the simple stiffness control unit 209 computes the control input for realizing the desired joint stiffness, the target value of the joint stiffness can be easily changed.

Third Embodiment

A robot according to a third embodiment of the present invention will be described. In the present third embodiment, tensional force of wires and joint stiffness are controlled in a two-link manipulator as a robot body including wires and including a drive unit with artificial muscle actuators.

(3.1 Derivation of Model)

Figure 16:
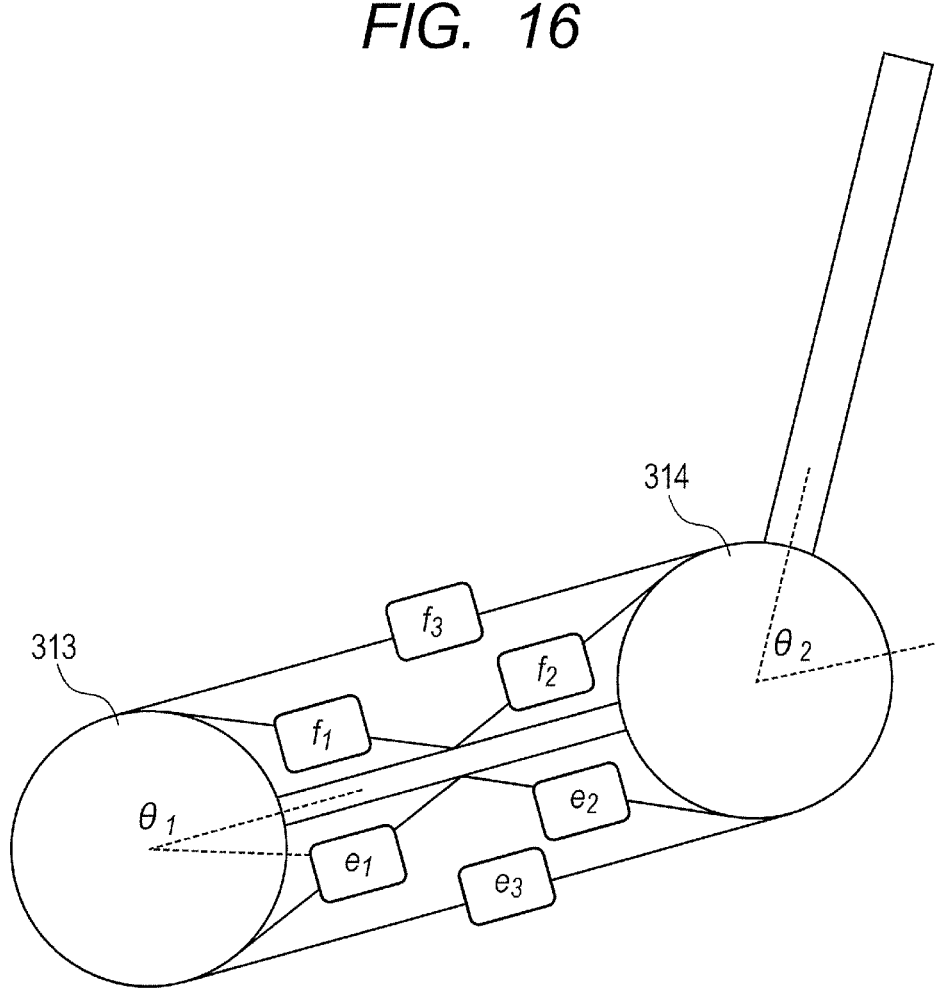
FIG. 16 is a diagram illustrating a two-link arm model including a structure with three pairs of six muscles.

A brachial region of upper extremity and a femoral region of lower extremity of a human include two-joint simultaneous drive manipulators called biarticular muscle, and the biarticular muscles are known to play an important role in the stiffness control of hands. As illustrated in FIG. 16, a robot modeled on the upper extremity of a human has a structure with three pairs of six muscles, in which actuators $f_1$ and $e_1$ that drive a first joint 313, actuators $f_2$ and $e_2$ that drive a second joint 314, and actuators $f_3$ and $e_3$ that simultaneously drive the two joints are arranged in an antagonistic manner. The actuators $f_1$, $e_1$, $f_2$, $e_2$, $f_3$ and $e_3$ are artificial muscle actuators.

(3.1.1 Deviation of Simulation Model)

Figure 17:
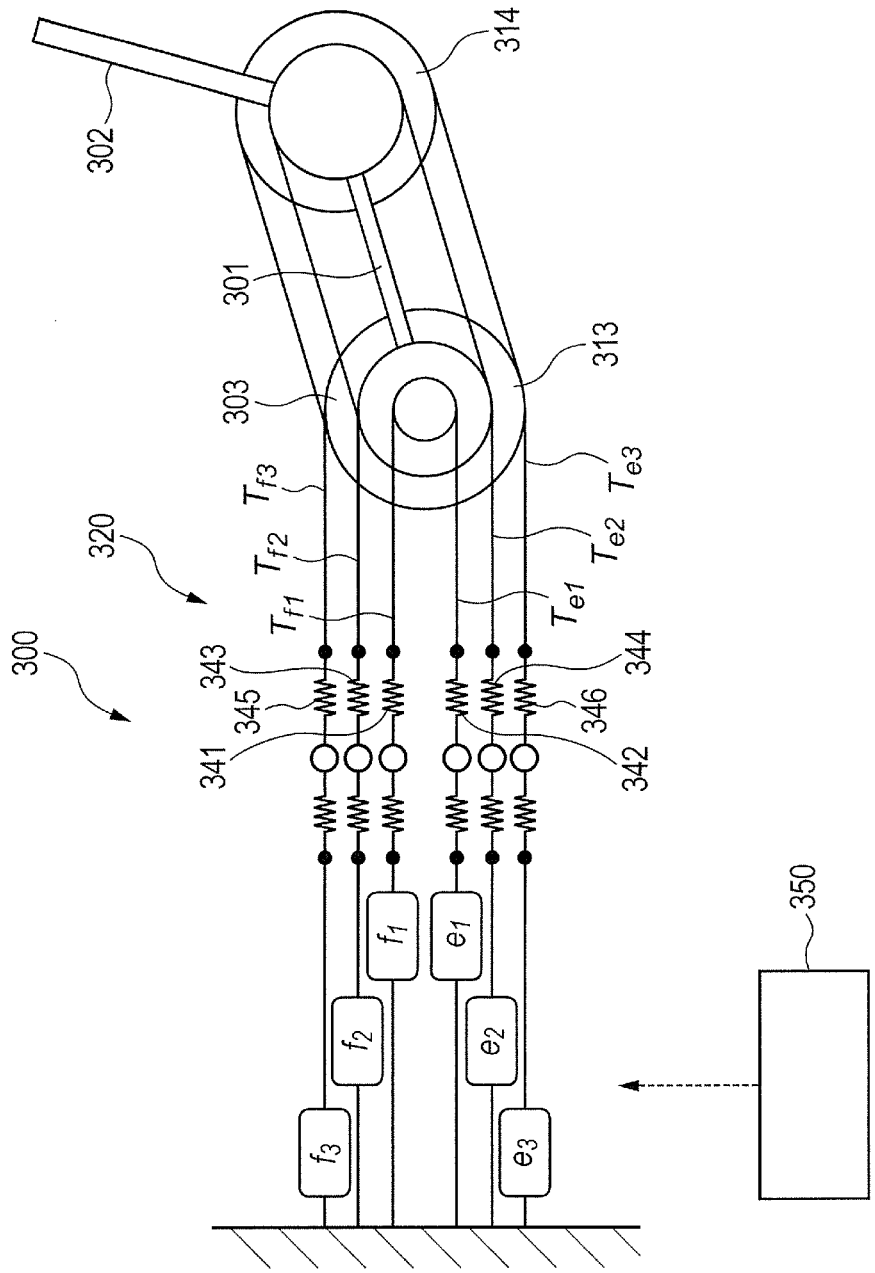
FIG. 17 is an explanatory view illustrating a schematic configuration of a robot according to a third embodiment of the present invention.

FIG. 17 is an explanatory view illustrating a schematic configuration of the robot according to the third embodiment of the present invention. A robot 300 of the present third embodiment includes: a robot body 320 as a two-link arm with three pairs of six muscles; and a control device 350.

The robot body 320 includes a first link 301, a second link 302, and a pulley 303 as a base portion. The first link 301 is rotatably coupled to the pulley 303 at the first joint 313. The second link 302 is rotatably coupled to the first link 301 at the second joint 314. The robot body 320 includes the actuators $f_1$, $e_1$, $f_2$, $e_2$, $f_3$ and $e_3$ and wires 341 to 346 as string-shaped members driven by the actuators. The wires 341, 343, 345 and the wires 342, 344, 346 are arranged in an antagonistic manner across the links 301 and 302.

The wires 341 and 342 are connected to the first link 301 through the pulley 303 to rotate the first link 301. The wires 343 and 344 are connected to the second link 302 through the pulley 303 to rotate the second link 302 relative to the first link 301. The wires 345 and 346 are connected to the first and second links 301 and 302 to simultaneously rotate the first and second links 301 and 302.

In the present third embodiment, Assumptions (1) to (5) are used as in the first embodiment to model the string vibration of the wires by one mass point and two springs.

The contractile force of the artificial muscle actuators $f_1$, $f_2$, $f_3$, $e_1$, $e_2$ and $e_3$ is defined as $u_{f1}$, $u_{f2}$, $u_{f3}$, $u_{e1}$, $u_{e2}$ and $u_{e3}$. The joint angles of the joints 313 and 314 are defined as $\theta_1$ and $\theta_2$. The moments of inertia of the links 301 and 302 are defined as $J_1$ and $J_2$. The lengths of the links 301 and 302 are defined as $L_1$ and $L_2$. The torque command values are defined as $\tau_{ref1}$ and $\tau_{ref2}$. In the present third embodiment, the moment arm radius, the elastic force constant and the viscous force constant of the actuators are equally defined as r, k and c, respectively. An equation of motion of the two-link manipulator including the structure with three pairs of six muscles is derived as follows.

$$M(\theta)\alpha + C(\theta,\omega) = \tau_{ref} + K_m\theta + C_m\omega \tag{38}$$

A joint angle $\theta$, a torque command value $\tau_{ref}$, an inertia matrix $M(\theta)$, Coriolis force/centrifugal force $C(\theta,\omega)$, an elastic coefficient matrix $K_m$ and an attenuation coefficient matrix $C_m$ of Formula (38) are as follows.

$$\theta = [\theta_1\ \theta_2]^T \tag{39}$$

$$\tau_{ref} = [\tau_{ref1}\ \tau_{ref2}]^T \tag{40}$$

$$M(\theta) = \begin{bmatrix} J_1 + J_2 + m_2L_1^2 + m_2L_1L_2\cos\theta_2 & J_2 + \frac{m_2L_1L_2}{2}\cos\theta_2 \\ J_2 + \frac{m_2L_1L_2}{2}\cos\theta_2 & J_2 \end{bmatrix} \tag{41}$$

$$C(\theta,\omega) = \begin{bmatrix} -\frac{m_2L_1L_2}{2}\sin\theta_2(2\theta_1\theta_2 + \theta_2^2) \\ \frac{m_2\theta_1^2L_1L_2}{2}\sin\theta_2 \end{bmatrix} \tag{42}$$

$$K_m = kr^2 \begin{bmatrix} (u_{f1}+u_{e1})+(u_{f3}+u_{e3}) & (u_{f3}+u_{e3}) \\ (u_{f3}+u_{e3}) & (u_{f2}+u_{e2})+(u_{f3}+u_{e3}) \end{bmatrix} \tag{43}$$

$$C_m = cr^2 \begin{bmatrix} (u_{f1}+u_{e1})+(u_{f3}+u_{e3}) & (u_{f3}+u_{e3}) \\ (u_{f3}+u_{e3}) & (u_{f2}+u_{e2})+(u_{f3}+u_{e3}) \end{bmatrix} \tag{44}$$

In the present third embodiment, a model of Formula (38) will be called a simulation model.

(3.1.2 Derivation of Approximate Model)

In this section, an approximate model of the two-link manipulator used to derive the control bandwidth of the position control unit is derived. Based on Formula (38), non-diagonal components exist in the inertia matrix $M(\theta)$, the elastic coefficient matrix $K_m$ and the attenuation coefficient matrix $C_m$. Therefore, it can be recognized that the two-link manipulator is a multi-input multi-output system in which motions of the joints interfere. It can also be recognized from Formula (38) that the inertia matrix $M(\theta)$ and the Coriolis force/centrifugal force $C(\theta,\omega)$ include non-linear terms. On the other hand, the interference and the non-linearity are not taken into account in the derivation method of the control bandwidth based on the loop transfer function according to the first embodiment, and the method cannot be applied to systems other than a single-input single-output system/linear system. Therefore, the simulation model is decoupled and linearized to derive an approximate model. The control bandwidth is derived by a loop transfer function multiplying the approximate model and the controller.

Assumptions (6) and (7) are used to decouple the simulation model.

Assumption (6): The Coriolis force and the centrifugal force are not taken into account.

Assumption (7): Only diagonal components are taken into account for the inertia matrix $M(\theta)$, the elastic coefficient matrix $K_m$ and the attenuation coefficient matrix $C_m$.

The simulation model is linearized near joint angles $\theta_{fin1}$ and $\theta_{fin2}$ at positioning ends.

$$\theta = [\theta_{fin1} \theta_{fin2}]^T \quad (45)$$

Based on assumptions (6) and (7) and Formula (45), the equation of motion of the approximate model is as follows.

$$M'\alpha = \tau_{ref} + K_m'\theta + C_m'\omega \quad (46)$$

In Formula (46), an inertia matrix M', an elastic coefficient matrix $K_m'$ and an attenuation coefficient matrix $C_m'$ are as follows.

$$M' = \begin{bmatrix} J_1 + J_2 + m_2 L_1^2 + m_2 L_1 L_2 \cos\theta_{fin2} & 0 \\ 0 & J_2 \end{bmatrix} \quad (47)$$

$$K_m' = kr^2 \begin{bmatrix} (u_{f1} + u_{e1}) + (u_{f3} + u_{e3}) & 0 \\ 0 & (u_{f2} + u_{e2}) + (u_{f3} + u_{e3}) \end{bmatrix} \quad (48)$$

$$C_m' = cr^2 \begin{bmatrix} (u_{f1} + u_{e1}) + (u_{f3} + u_{e3}) & 0 \\ 0 & (u_{f2} + u_{e2}) + (u_{f3} + u_{e3}) \end{bmatrix} \quad (49)$$

(3.2 Control System Design)

This section illustrates a configuration of the control system for controlling the contractile force of the artificial muscle actuators $f_1$, $f_2$, $f_3$, $e_1$, $e_2$ and $e_3$. A derivation method of tensional force minimum value using the approximate model and the simulation model derived in the previous section is also illustrated.

(3.2.1 Configuration of Control System)

In the present third embodiment, the actuators $f_1$ and $e_1$ that drive the first joint 313 control the joint angle $\theta_1$ and the wire tensional force $T_{f1}$ and $T_{e1}$. Similarly, the actuators $f_2$ and $e_2$ that drive the second joint 314 control the joint angle $\theta_2$ and the wire tensional force $T_{f2}$ and $T_{e2}$.

In these control systems, the tensional force control and the stiffness control are switched according to the wire tensional force as in the second embodiment. On the other hand, the two-joint simultaneous drive actuators $f_3$ and $e_3$ control only the joint stiffness and are not used for the control of the joint angle. This is for preventing the design of the position control unit and the derivation of the control bandwidth from becoming complicated. In this case, the torque command values for the actuators $f_3$ and $e_3$ are 0. Therefore, based on Formulas (35) and (36) of the second embodiment, the contractile force command values $u_{f3}$ and $u_{e3}$ based on the stiffness control can be expressed as follows by using a stiffness command value $U_{ref3}$ of the two-joint simultaneous drive actuators $f_3$ and $e_3$.

$$u_{f3} = u_{e3} = \frac{U_{ref3}}{2} \quad (50)$$

Figure 18:
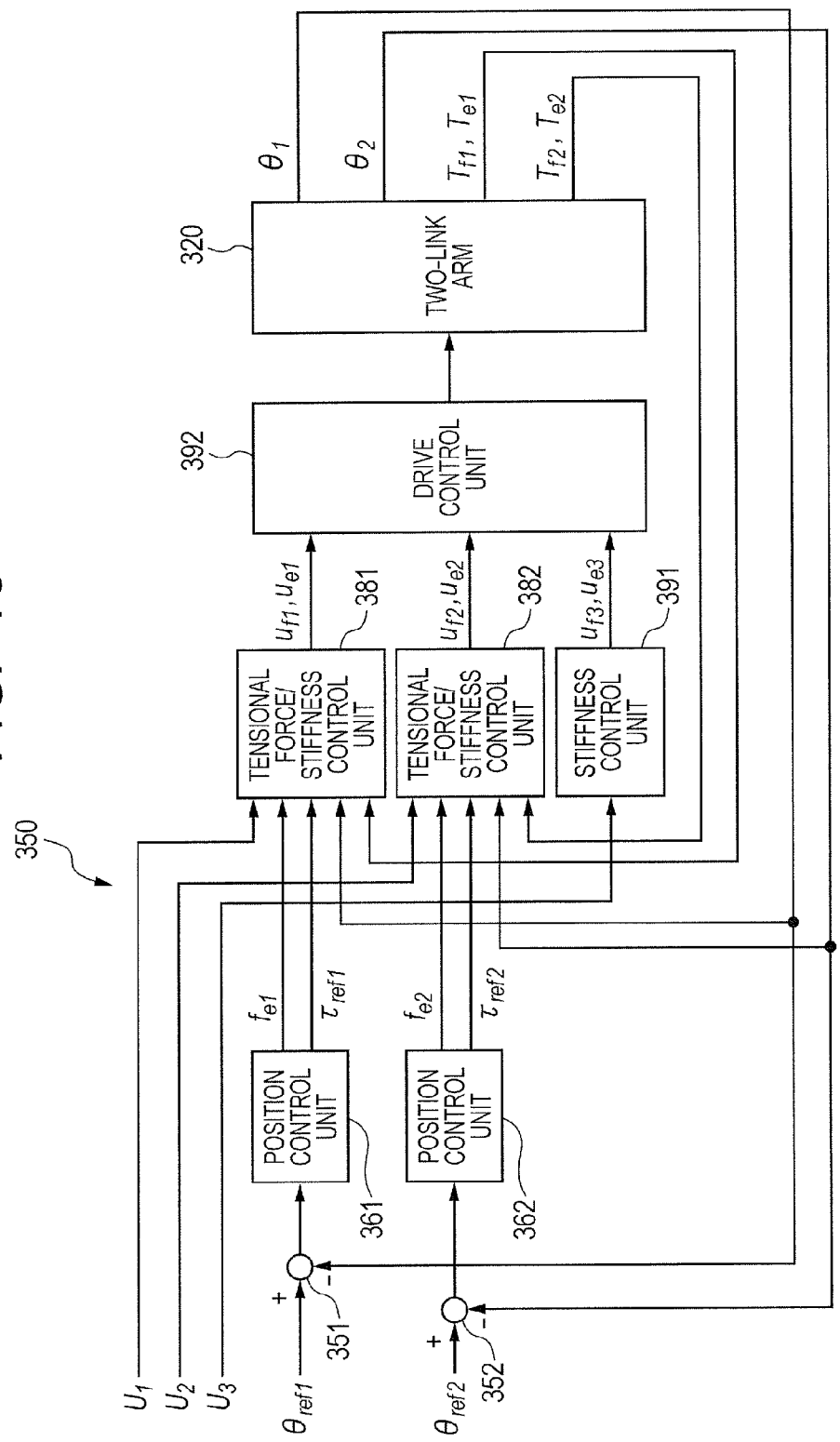
FIG. 18 is a block diagram illustrating a control device of the robot according to the third embodiment of the present invention.

FIG. 18 is a block diagram illustrating the control device of the robot according to the third embodiment of the present invention. The control device 350 includes subtraction units 351 and 352, position control units 361 and 362, tensional force/stiffness control units 381 and 382, a stiffness control unit 391 and a drive control unit 392.

The subtraction units 351 and 352 as well as the position control units 361 and 362 have configurations similar to the subtraction unit 151 and the position control unit 152 of the first embodiment.

The tensional force/stiffness control units 381 and 382 have configurations similar to the tensional force/stiffness control unit 208 of the second embodiment.

The stiffness control unit 391 is a feedforward control unit that outputs the contractile force command values $u_{f3}$ and $u_{e3}$ illustrated in Formula (50). The drive control unit 392 receives input of the contractile force command values $u_{f1}$, $u_{f2}$, $u_{f3}$, $u_{e1}$, $u_{e2}$ and $u_{e3}$ to generate contractile force corresponding to the contractile force command values $u_{f1}$, $u_{f2}$, $u_{f3}$, $u_{e1}$, $u_{e2}$ and $u_{e3}$ on the actuators $f_1$, $f_2$, $f_3$, $e_1$, $e_2$ and $e_3$. The robot body 320 to be controlled is a two-link arm modeled by Formula (38).

(3.2.2 Derivation of Control Bandwidth)

A loop transfer function $P_1(s)K_1(s)$, which is obtained by multiplying a transfer function $P_1(s)$ of the approximate model by a transfer function $K_1(s)$ of the position control unit 361, is used to derive a control bandwidth $f_{c1}$ of the position control unit 361. A loop transfer function $P_2(s)K_2(s)$, which is obtained by multiplying a transfer function $P_2(s)$ of the approximate model by a transfer function $K_2(s)$ of the position control unit 362, is used to derive a control bandwidth $f_{c2}$ of the position control unit 362.

Based on Formula (38), the transfer functions $P_1(s)$ and $P_2(s)$ from the torque command values $\tau_{ref1}$ and $\tau_{ref2}$ to the joint angles $\theta_1$ and $\theta_2$ in the approximate model are expressed as follows by using sums $U_1$, $U_2$ and $U_3$ of the contractile force command values $u_{f1}$, $u_{f2}$, $u_{f3}$, $u_{e1}$, $u_{e2}$, and $u_{e3}$.

$$P_1(s) = \frac{1}{(J_1 + J_2 + m_2 L_1^2 + m_2 L_1 L_2 \cos\theta_{2ref})s^2 + cr^2(U_1 + U_3)s + kr^2(U_1 + U_3)} \quad (51)$$

$$P_2(s) = \frac{1}{J_2 s^2 + cr^2(U_2 + U_3)s + kr^2(U_2 + U_3)} \quad (52)$$

In the present third embodiment, PID control units serve as the position control units 361 and 362. Therefore, the transfer functions $K_1(s)$ and $K_2(s)$ are expressed as follows by using derivative gains $K_{d1}$ and $K_{d2}$, proportional gains $K_{p1}$ and $K_{p2}$, integral gains $K_{i1}$ and $K_{i2}$, and time constants $T_{d1}$ and $T_{d2}$.

$$K_1(s) = K_{p1} + \frac{K_{i1}}{s} + \frac{sK_{d1}}{T_{d1}s + 1} \quad (53)$$

$$K_2(s) = K_{p2} + \frac{K_{i2}}{s} + \frac{sK_{d2}}{T_{d2}s + 1} \quad (54)$$

In the present third embodiment, the position control units 361 and 362 are designed so that the control bandwidth is higher than the natural frequency of the link caused by the elasticity of muscle. Therefore, the following is obtained by considering only the first-order term in relation to the Laplace operator s in the loop transfer functions $P_1(s)K_1(s)$ and $P_2(s)K_2(s)$.

$$P_1(s)K_1(s) = \frac{K_{d1}}{(J_1 + J_2 + m_2L_1^2 + m_2L_1L_2\cos\theta_{fin2})s} \quad (55)$$

$$P_2(s)K_2(s) = \frac{K_{d2}}{J_2 s} \quad (56)$$

Based on Formulas (55) and (56), the control bandwidths $f_{c1}$ and $f_{c2}$ are expressed as follows.

$$f_{c1} = \frac{K_{d1}}{2\pi(J_1 + J_2 + m_2L_1^2 + m_2L_1L_2\cos\theta_{fin2})} \quad (57)$$

$$f_{c2} = \frac{K_{d2}}{2\pi J_2} \quad (58)$$

(3.2.3 Derivation of Tensional Force Minimum Values)

The approximate model includes model errors caused by linearization and decoupling. Therefore, the tensional force minimum values derived by using the control bandwidths $f_{c1}$ and $f_{c2}$ may be smaller than the tensional force necessary to stabilize the actual control system, and the control system may become unstable. In the present third embodiment, the tensional force minimum values $T_{min1}$ and $T_{min2}$ are corrected by a simulation to derive appropriate tensional force minimum values $T_{min1}$ and $T_{min2}$.

The stability of the control system in the approximate model is checked while gradually increasing the amplification factors $a_1$ and $a_2$ from 1 to derive initial values of the amplification factors $a_1$ and $a_2$. Based on the initial values of the amplification factors $a_1$ and $a_2$ and Formulas (15) and (17), the initial values $T_{min1}$ and $T_{min2}$ of the tensional force minimum values are computed, and the simulation model is used to check the stability of the control system. The amplification factors $a_1$ and $a_2$ are reduced if the control system is stable, and the amplification factors $a_1$ and $a_2$ are increased if the control system is unstable. The new amplification factors $a_1$ and $a_2$ are used to compute the tensional force minimum values $T_{min1}$ and $T_{min2}$, and the simulation model is used to check the stability and to update the amplification factors $a_1$ and $a_2$. This is repeated to derive the tensional force minimum values $T_{min1}$ and $T_{min2}$.

(3.3 Simulation Result)

In this section, the control system derived in the previous section is used to perform a positioning simulation of the two-link arm. The physical parameters of the wires are the same as in the first embodiment. The control bandwidths $f_{c1}$ and $f_{c2}$ are 25 Hz. The amplification factor a is 2. The tensional force minimum values $T_{min1}$ and $T_{min2}$ are 4 N. The stiffness command values $U_{ref1}$, $U_{ref2}$ and $U_{ref3}$ are 12.5 N, 12.5 N and 3 N, respectively. A ramp signal that increases from 0 rad to 0.5 rad between 0.2 sec and 0.7 sec is provided for reference joint angles $\theta_{ref1}$ and $\theta_{ref2}$. To confirm that the control system is stable even if there is a string vibration, a pulse disturbance of 0.6 N is applied to each wire between 0.5 sec and 0.51 sec.

Figure 19A:
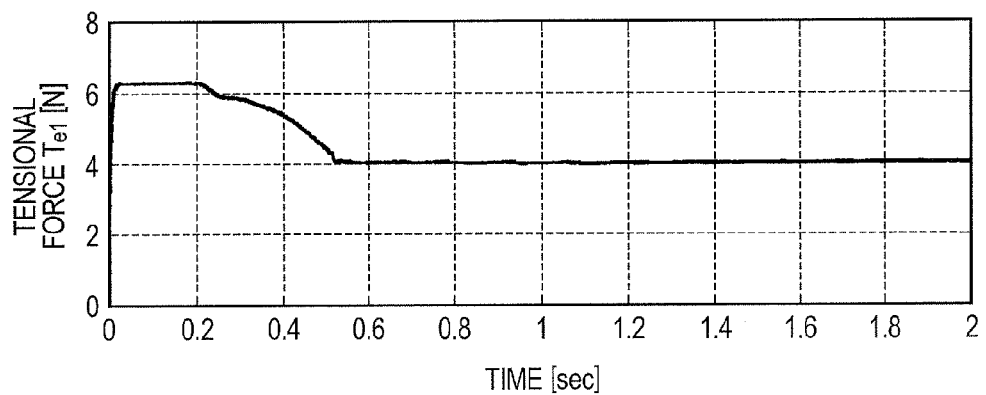
FIGS. 19A and 19B are diagrams illustrating simulation results according to the third embodiment of the present invention.
Figure 19B:
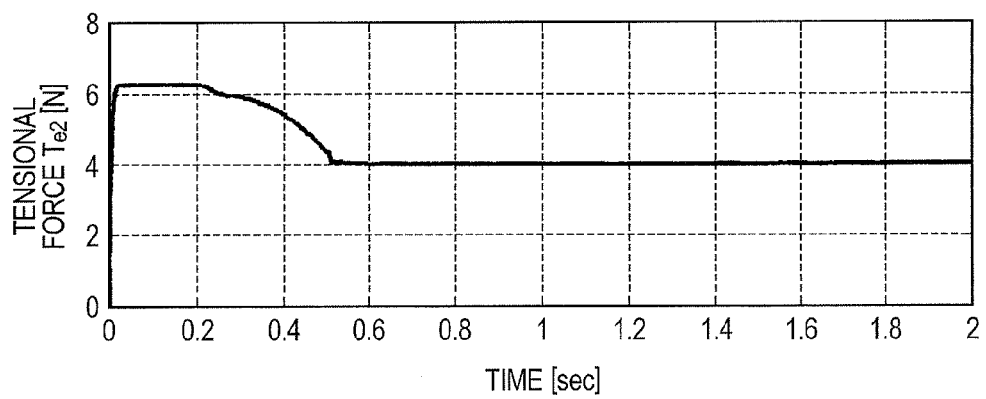
Figure 20A:
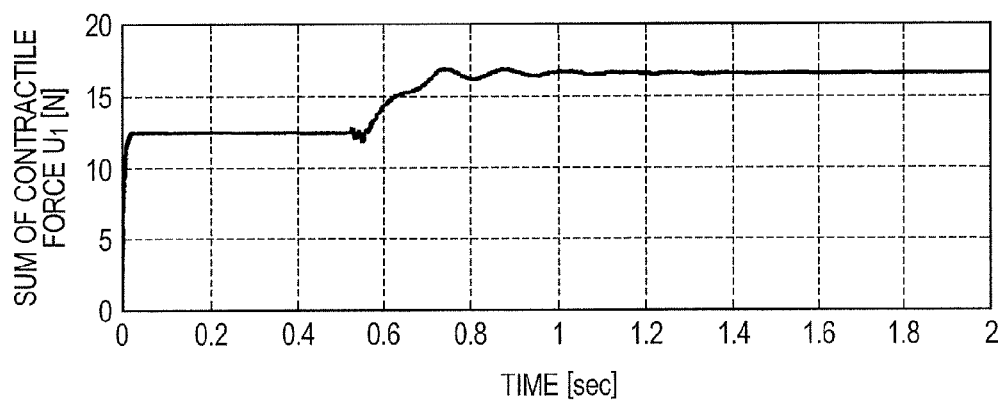
FIGS. 20A and 20B are diagrams illustrating simulation results according to the third embodiment of the present invention.
Figure 20B:
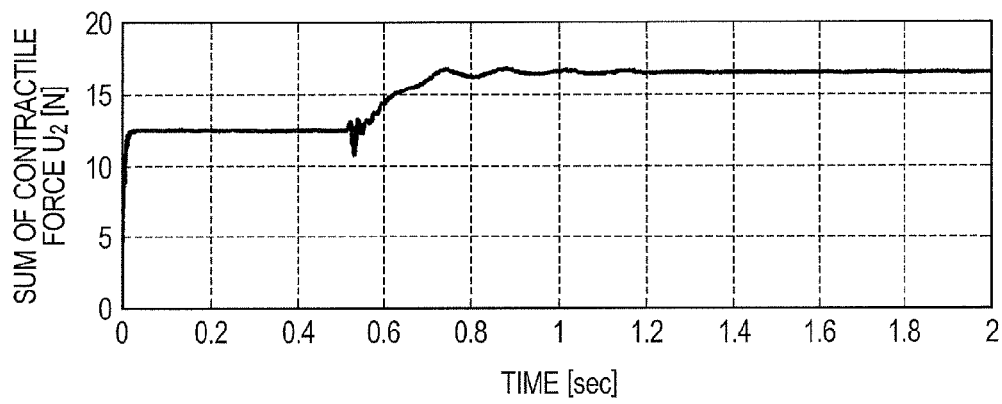
Figure 21A:
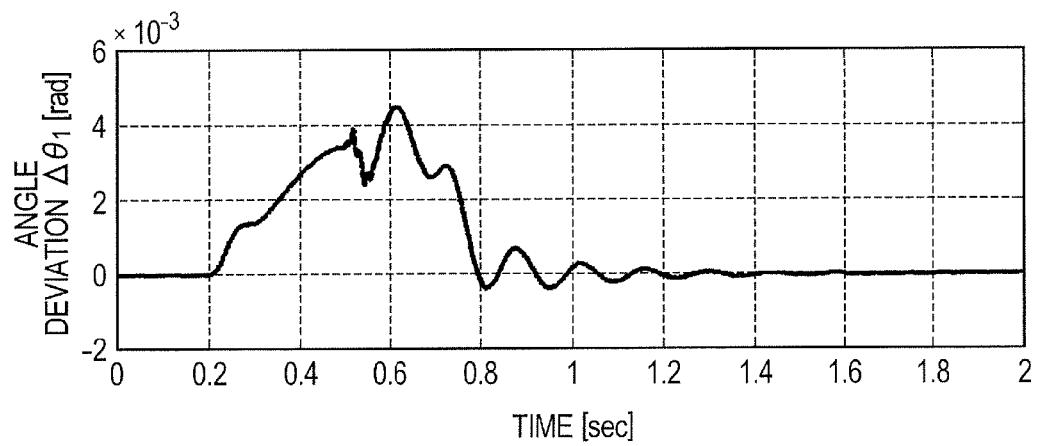
FIGS. 21A and 21B are diagrams illustrating simulation results according to the third embodiment of the present invention.
Figure 21B:
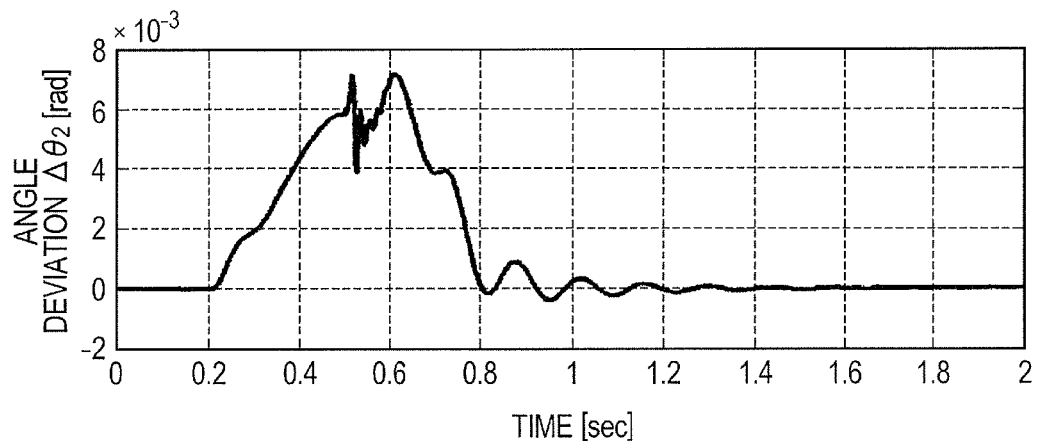

FIGS. 19A and 19B illustrate responses of the tensional force $T_{e1}$ and the tensional force $T_{e2}$, respectively. FIGS. 20A and 20B illustrate responses of the sum $U_1$ and the sum $U_2$ of the contractile force, respectively. FIGS. 21A and 21B illustrate responses of an angular deviation $\Delta\theta_1$ and an angular deviation $\Delta\theta_2$, respectively. Based on FIGS. 19A and 19B, it can be recognized that the tensional force $T_{e1}$ and the tensional force $T_{e2}$ are equal to or greater than the tensional force minimum value 4 N between 0 sec and 0.5 sec. If the tensional force of the wire is greater than the tensional force minimum value, the tensional force/stiffness control units 381 and 382 perform the stiffness control for realizing the desired joint stiffness. Therefore, as illustrated in FIGS. 20A and 20B, it can be recognized that the joint stiffness $U_1$ and $U_2$ coincides with the stiffness command values $U_{ref1}$ and $U_{ref2}$, respectively, between 0 sec and 0.5 sec.

On the other hand, it can be recognized from FIGS. 19A and 19B that the tensional force $T_{e1}$ and the tensional force $T_{e2}$ coincide with the tensional force minimum value 4 N after 0.5 sec. This is because the tensional force/stiffness control units 381 and 382 control the wire tensional force to be equal to or greater than the tensional force minimum value.

As illustrated in FIGS. 20A and 20B, since the control of the joint stiffness is switched to the tensional force control after 0.5 sec, the joint stiffness $U_1$ and $U_2$ is greater than the stiffness command values $U_{ref1}$ and $U_{ref2}$. However, since the control system is stabilized by the tensional force control as illustrated in FIGS. 21A and 21B, it can be recognized that the angular deviation $\Delta\theta_1$ and the angular deviation $\Delta\theta_2$ are converted to 0 rad even if there is a string vibration. As a result, it can be recognized that the tensional force of the wires of equal to or greater than the tensional force minimum value can be maintained to stabilize the control system when the tensional force/stiffness control units 381 and 382 of the present third embodiment are applied as multi-joint manipulators. It can also be recognized that the switch control of the tensional force control and the stiffness control can realize the desired joint stiffness if the tensional force of the wires is greater than the tensional force minimum value.

The present invention is not limited to the embodiments described above, and those with general knowledge in the field can make a large number of modifications within the technical concept of the present invention.

Although the wires are used as the string-shaped members in the description of the first to third embodiments, the string-shaped members are not limited to these. The string-shaped members may be belts, for example.

Although the actuators that form the drive unit are the artificial muscle actuators in the description of the first to third embodiments, the arrangement is not limited to this. Any actuators equivalent to the artificial muscle actuators, i.e. actuators that can be approximated to the viscoelastic model as illustrated in FIG. 1, can be used. For example, the actuators can include combinations of rotary motors and springs.

According to the present invention, the tensional force of each string-shaped member is controlled so that the natural frequency of each string-shaped member exceeds the control bandwidth of the position control unit. Therefore, the control system becomes stable even if a position control unit with a wide control bandwidth is used, and highly accurate positioning control of a link is possible. The tensional force is controlled to the minimum level necessary to stabilize the control system based on the control bandwidth of the position control unit. Therefore, the stiffness of the joint is not excessively increased, and the flexibility of the joint is not lost.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-141597, filed Jun. 25, 2012, which is hereby incorporated by reference herein in its entirety.

What is claimed is:

1. A robot comprising:
   a link that rotates around a joint that serves as an axis;
   a first string-shaped member and a second string-shaped member connected to the link and arranged in an antagonistic manner;
   a drive unit that includes a first actuator that generates driving force for advancing and retreating the first string-shaped member and a second actuator that generates driving force for advancing and retreating the second string-shaped member, the drive unit generating torque around the joint and stiffness of the joint based on the driving force of the first actuator and the driving force of the second actuator; and
   a control device that controls the driving force generated by the first actuator and the second actuator,
   the control device comprising:
      a position control unit that calculates a torque command value around the joint based on angular deviation of a joint angle relative to a reference joint angle received from outside of the robot;
      a tensional force minimum value calculation unit that obtains a natural frequency of each string-shaped member satisfying $f_n > f_{min} > f_c$,
   $f_{min}$ indicating the natural frequency, $f_c$ indicating a control bandwidth of the position control unit, $f_n$ indicating a Nyquist frequency of the position control unit, and
      the tensional force minimum value calculation unit calculates a tensional force minimum value of the first string-shaped member and the second string-shaped member from a relational expression $T_{min} = 4 \times L^2 \times \mu \times f_{min}^2$,
   L indicating length of the first string-shaped member and the second string-shaped member, $\mu$ indicating linear mass density of the first string-shaped member and the second string-shaped member, and $T_{min}$ indicating the tensional force minimum value;
      a driving force command value calculation unit that calculates driving force command values of the first actuator and the second actuator by using the tensional force minimum value, the joint angle and the torque command value so that tensional force of one of the first string-shaped member and the second string-shaped member with the smaller tensional force coincides with the tensional force minimum value; and
      a drive control unit that generates, on the first actuator and the second actuator, driving force corresponding to the driving force command values obtained by the driving force command value calculation unit.

2. The robot according to claim 1, wherein
   the driving force command value calculation unit
   uses the tensional force minimum value, the joint angle and the torque command value to calculate the driving force command values of the first actuator and the second actuator so that the tensional force of one of the first string-shaped member and the second string-shaped member with the smaller tensional force coincides with the tensional force minimum value if the tensional force of at least one of the first string-shaped member and the second string-shaped member is smaller than the tensional force minimum value and
   uses a stiffness command value received from outside of the robot and the torque command value to calculate the driving force command values of the first actuator and the second actuator so that the stiffness of the joint coincides with the stiffness command value if the tensional force of both of the first string-shaped member and the second string-shaped member is greater than the tensional force minimum value.

3. The robot according to claim 1, wherein
   the first actuator and the second actuator are pneumatic actuators.

4. The robot according to claim 1, wherein
   the first actuator and the second actuator are actuators with combinations of rotary motors and springs.

5. The robot according to claim 1, wherein
   the first string-shaped member and the second string-shaped member are wires.

6. The robot according to claim 1, wherein
   the first string-shaped member and the second string-shaped member are belts.

7. The robot according to claim 1, wherein
   the control device is a control device that controls movement of an arm.

8. The robot according to claim 1, wherein
   the torque around the joint is generated based on a difference between the driving force of the first actuator and the driving force of the second actuator, and the stiffness of the joint is generated based on the driving force of the first actuator and the driving force of the second actuator.

9. The robot according to claim 1, wherein
   the torque around the joint is generated based on a difference between the driving force of the first actuator and the driving force of the second actuator, and the stiffness of the joint is generated based on a sum of the driving force of the first actuator and the driving force of the second actuator.

10. The robot according to claim 1, wherein the driving force command value calculation unit comprises a low-pass filter, and the driving force command value calculation unit outputs the tensional force command values via the low-pass filter.

11. A robot control method of controlling a robot body by a control device, the robot body comprising: a link that rotates around a joint that serves as an axis; a first string-shaped member and a second string-shaped member connected to the link and arranged in an antagonistic manner; and a drive unit that includes a first actuator that generates driving force for advancing and retreating the first string-shaped member and a second actuator that generates driving force for advancing and retreating the second string-shaped member, the drive unit generating torque around the joint and stiffness of the joint based on the driving force of the first actuator and the driving force of the second actuator, the robot control method comprising:
   a position control unit of the control device calculating a torque command value around the joint of the link based on angular deviation of a joint angle relative to a reference joint angle received from outside of the robot body;
   a tensional force minimum value calculation unit of the control device obtaining a natural frequency of each string-shaped member satisfying $f_n > f_{min} > f_c$, $f_{min}$ indicating the natural frequency, $f_c$ indicating a control bandwidth of the position control unit, $f_n$ indicating a Nyquist frequency of the position control unit, and calculating a tensional force minimum value of the first string-shaped member and the second string-shaped member from a relational expression $T_{min} = 4 \times L^2 \times \mu \times f_{min}^2$, L indicating length of the first string-shaped member and the second string-shaped member, $\mu$ indicating linear mass density of the first and second string-shaped members, and $T_{min}$ indicating the tensional force minimum value;

a driving force command value calculation unit of the control device calculating driving force command values of the first actuator and the second actuator by using the tensional force minimum value, the joint angle and the torque command value so that tensional force of one of the first string-shaped member and the second string-shaped member with the smaller tensional force coincides with the tensional force minimum value; and a drive control unit of the control device generating, on the first actuator and the second actuator, driving force corresponding to the driving force command values obtained by the driving force command value calculation unit.

12. The robot control method according to claim 11, wherein the driving force command value calculation unit uses the tensional force minimum value, the joint angle and the torque command value to calculate the driving force command values of the first actuator and the second actuator so that the tensional force of one of the first string-shaped member and the second string-shaped member with the smaller tensional force coincides with the tensional force minimum value if the tensional force of at least one of the first string-shaped member and the second string-shaped member is smaller than the tensional force minimum value and the driving force command value calculation unit uses a stiffness command value received from outside of the robot body and the torque command value to calculate the driving force command values of the first actuator and the second actuator so that the stiffness of the joint coincides with the stiffness command value if the tensional force of both of the first string-shaped member and the second string-shaped member is greater than the tensional force minimum value.

13. The robot control method according to claim 11, wherein the torque around the joint is generated based on a difference between the driving force of the first actuator and the driving force of the second actuator, and the stiffness of the joint is generated based on the driving force of the first actuator and the driving force of the second actuator.

14. The robot control method according to claim 11, wherein the torque around the joint is generated based on a difference between the driving force of the first actuator and the driving force of the second actuator, and the stiffness of the joint is generated based on a sum of the driving force of the first actuator and the driving force of the second actuator.

15. A robot comprising:

a first link that rotates around a first joint that serves as an axis;

a first wire or belt and a second wire or belt coupled to the first link in an antagonistic manner;

a drive unit having a first actuator that generates driving force for advancing and retreating the first wire or belt and a second actuator that generates driving force for advancing and retreating the second wire or belt, the drive unit generating torque around the first joint and stiffness of the first joint based on the driving force of the first actuator and the driving force of the second actuator;

a position control unit that calculates a torque command value around the first joint based on angular deviation of a first joint angle relative to a reference first joint angle;

a control device that controls the drive unit at a frequency within a control bandwidth such that the natural frequencies of the first and second wires or belts are greater than the control bandwidth of the control unit and the natural frequencies of the first and second wires or belts are smaller than a Nyquist frequency of the position control unit; and a driving force command value calculation unit that calculates driving force command values of the first and second actuators based on the natural frequencies of the first and second wires or belts, the first joint angle and the torque command value around the first joint.

16. The robot according to claim 15, further comprising:

a second link that rotates around a second joint that serves as an axis;

third and fourth wires or belts coupled to the second link in an antagonistic manner and rotates the second link relative to the first link; and fifth and sixth wires or belts coupled to the first link and the second link in an antagonistic manner and rotates the first link and the second link; wherein the drive unit further has third to sixth actuators that generate a driving force for advancing and retreating the third to sixth wires or belts, respectively; wherein the control device controls the drive unit such that the natural frequencies of the third to sixth wires or belts are greater than a control bandwidth of the control unit.

17. The robot according to claim 15, further comprising a drive control unit that generates, on the first actuator and the second actuator, driving force corresponding to the driving force command values.

18. The robot according to claim 15, wherein the driving force command value calculation unit calculates the driving force command values such that a tensional force of one of the first and second wires or belts with the smaller tensional force coincides with a value $4 \times L^2 \times \mu \times f_{min}^2$, where L indicates length of the first and second wires or belts, $\mu$ indicates linear mass density of the first and second wires or belts, and $f_{min}$ indicates the natural frequency of each of the first and second wires or belts.

* * * * *